US009061732B1

(12) United States Patent
Vezina

(10) Patent No.: US 9,061,732 B1
(45) Date of Patent: Jun. 23, 2015

(54) LEANING VEHICLE

(71) Applicant: BOMBARDIER RECREATIONAL PRODUCTS INC., Valcourt (CA)

(72) Inventor: Sebastien Vezina, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 34 days.

(21) Appl. No.: 13/955,830

(22) Filed: Jul. 31, 2013

Related U.S. Application Data

(60) Provisional application No. 61/677,621, filed on Jul. 31, 2012.

(51) Int. Cl.
 *B62D 9/02* (2006.01)
 *B62M 27/02* (2006.01)
 *B62L 5/10* (2006.01)

(52) U.S. Cl.
 CPC ......... *B62M 27/02* (2013.01); *B62M 2027/026* (2013.01); *B62L 5/10* (2013.01)

(58) Field of Classification Search
 CPC .......................................................... B62K 5/10
 USPC ............................. 180/190, 182; 280/124.103
 See application file for complete search history.

(56) References Cited

U.S. PATENT DOCUMENTS

| 3,583,507 | A | * | 6/1971 | Trautwein | ...................... | 180/190 |
| 4,546,997 | A | * | 10/1985 | Smyers | ...................... | 280/5.509 |
| 7,530,419 | B2 | | 5/2009 | Brudeli | | |
| 7,648,148 | B1 | | 1/2010 | Mercier | | |
| 8,070,172 | B1 | * | 12/2011 | Smith et al. | ............ | 280/124.103 |
| 8,123,240 | B2 | | 2/2012 | Mercier | | |
| 8,235,398 | B2 | | 8/2012 | Mercier | | |
| 8,317,207 | B2 | | 11/2012 | Mercier | | |
| 8,336,660 | B2 | | 12/2012 | Ogura et al. | | |
| 8,360,440 | B2 | | 1/2013 | Mercier | | |
| 8,602,421 | B2 | | 12/2013 | Mercier | | |
| 8,746,717 | B2 | * | 6/2014 | Tsujii et al. | ............ | 280/124.103 |
| 2010/0133772 | A1 | * | 6/2010 | Marabese et al. | ...... | 280/124.103 |
| 2011/0006498 | A1 | * | 1/2011 | Mercier | ................. | 280/124.103 |
| 2013/0113174 | A1 | | 5/2013 | Mercier | | |

* cited by examiner

*Primary Examiner* — Tony Winner
(74) *Attorney, Agent, or Firm* — BCF LLP

(57) ABSTRACT

A leaning vehicle has a shock tower, a frame pivotable relative to the shock tower, front left and right suspension assemblies, front left and right ground engaging members, a rear suspension assembly, and a rear ground engaging member. A pair of first stoppers is connected to one of the frame and the shock tower to limit pivoting of the frame relative to the shock tower. Each front suspension assembly has: a leg, upper and lower suspension arms, and a shock absorber having an upper end connected to the shock tower and a lower end connected to the lower suspension arm. A pair of second stoppers is connected to one of the frame and the lower suspension arms to limit leaning of the vehicle relative to vertical when the frame has pivoted relative to the shock tower and the shock absorber of one of the suspension assemblies is compressed.

27 Claims, 23 Drawing Sheets

LEANING VEHICLE

CROSS-REFERENCE

The present application claims priority to U.S. Provisional Patent Application No. 61/677,621, filed Jul. 31, 2012, the entirety of which is incorporated herein by reference.

TECHNICAL FIELD

The present application relates to leaning vehicles.

BACKGROUND

Typically, snowmobiles have two front skis connected to a handlebar and a rear endless track connected to an engine to propel the snowmobile. In such typical snowmobiles, the snowmobile is steered by turning the handlebar in the direction in which the driver wants to turn. This is known as steer-in-direction. During a turn, the suspension assembly connected to the ski on the outside of the turn is compressed, causing the snowmobile to roll slightly toward the outside of the turn, which the driver can compensate by leaning toward the inside of the turn.

In other vehicles, such as motorcycles, the vehicle is steered by what is known as countersteering. In a motorcycle for example, the motorcycle turns by leaning in the direction of the turn. To achieve this leaning, the driver momentarily turns the handlebar in the direction opposite to the direction of the turn (i.e. the driver countersteers).

Driving a vehicle that can lean into a turn offers a much different driving experience than driving a vehicle that is steer-in-direction. It would be desirable to at least some drivers to have the driving experience of a leaning vehicle on a vehicle having three ground engaging members such as a snowmobile.

U.S. Pat. No. 7,648,148 B1, issued Jan. 19, 2010, and U.S. Pat. No. 7,530,419 B2, issued May 12, 2009, describe three-wheel vehicles that can lean in a turn. In vehicles of this type, the frame of the vehicle is pivotally connected to a shock tower (also known as a transfer frame) and the front shock absorbers associated with the two front wheels are connected at their upper end to the shock tower. During a turn, the frame pivots into the turn like on a motorcycle, but the shock tower remains essentially vertical. As a result, the front shock absorbers do not get compressed due to the leaning of the frame.

Leaning of such vehicles having three ground engaging members can be achieved in two ways. The first is assisted leaning in which an actuator pivots the frame relative to the shock tower based on signals received from one or more sensors on the vehicle, some examples of which are provided in U.S. Pat. No. 7,648,148 B1. The second is unassisted leaning, in which the pivoting of the frame relative to the shock tower is the result of the countersteering effected by the driver and the balancing of the forces acting on the vehicle during the turn.

One of the advantages of unassisted leaning over assisted leaning is that a vehicle with unassisted leaning is mechanically and electronically less complex than an assisted leaning vehicle as it does not require an actuator, its associated components, sensors and an electronic control system to control the actuator based on the signals from the sensors. However, one of the advantages of assisted leaning over unassisted leaning is that the actuator can be used to limit the leaning of the frame relative to the shock tower.

As such, there is a need for a system for limiting the leaning of a frame of an unassisted leaning vehicle having at least three ground engaging members relative to a shock tower of such a vehicle.

SUMMARY

One object of the present invention is to ameliorate at least some of the inconveniences of the prior art.

In one aspect, a leaning vehicle has a frame having a front portion and a rear portion, a straddle seat mounted on the frame, a motor supported by the frame and a shock tower pivotally connected to the front portion of the frame. The frame is pivotable relative to the shock tower about a pivot axis between an upright position and a plurality of leaning positions. A first left stopper is connected to one of the frame and the shock tower. The first left stopper is adapted to abut another one of the frame and the shock tower when the frame pivots left relative to the shock tower by a first angle thereby limiting pivoting of the frame relative to the shock tower toward the left. A first right stopper is connected to one of the frame and the shock tower. The first right stopper is adapted to abut another one of the frame and the shock tower when the frame pivots right relative to the shock tower by a second angle thereby limiting pivoting of the frame relative to the shock tower toward the right. A front left suspension assembly and a front right suspension assembly are operatively connected to the front portion of the frame. A front left ground engaging member is operatively connected to the front left suspension assembly. A front right ground engaging member is operatively connected to the front right suspension assembly. A steering assembly is operatively connected to the front left ground engaging member and to the front right ground engaging member to steer the vehicle. The steering assembly has a steering column supported by the frame and a handlebar connected to the steering column. A rear suspension assembly is operatively connected to the rear portion of the frame. A rear ground engaging member is operatively connected to the rear suspension assembly. Each of the front left suspension assembly and the front right suspension assembly has: a leg operatively connected to a corresponding one of the front left ground engaging member and the front right ground engaging member, the leg being rotatable about a steering axis, an upper suspension arm having a first end pivotally connected to the frame and a second end pivotally connected to the leg, a lower suspension arm having a first end pivotally connected to the frame and a second end pivotally connected to the leg, the lower suspension arm being lower than the upper suspension arm, and a shock absorber having an upper end connected to the shock tower and a lower end connected to the lower suspension arm. A second left stopper is connected to one of the frame and the lower suspension arm of the front left suspension assembly. The second left stopper is adapted to abut another one of the frame and the lower suspension arm of the front left suspension assembly when the frame pivots left relative to the shock tower by the first angle and the shock absorber of the left suspension assembly is compressed by a first amount thereby limiting leaning of the vehicle relative to vertical toward the left. A second right stopper is connected to one of the frame and the lower suspension arm of the front right suspension assembly. The second right stopper is adapted to abut another one of the frame and the lower suspension arm of the front right suspension assembly when the frame pivots right relative to the shock tower by the second angle and the shock absorber of the right suspension assembly is compressed by a second amount thereby limiting leaning of the vehicle relative to vertical toward the right.

In a further aspect, the first left stopper and the first right stopper are connected to the shock tower.

In an additional aspect, the second left stopper and the second right stopper are connected to the frame.

In a further aspect, when the frame is in the upright position, the first left stopper and the first right stopper are vertically higher than the second left stopper and the second right stopper.

In an additional aspect, the second left stopper and the second right stopper are connected to the frame.

In a further aspect, the lower suspension arm of each of the front left suspension assembly and the front right suspension assembly is a lower A-arm having a cross-member. The second left stopper is adapted to abut the cross-member of the lower A-arm of the front left suspension assembly when the frame pivots left relative to the shock tower by the first angle and the shock absorber of the left suspension assembly is compressed by the first amount. The second right stopper is adapted to abut the cross-member of the lower A-arm of the front right suspension assembly when the frame pivots right relative to the shock tower by the second angle and the shock absorber of the right suspension assembly is compressed by the second amount.

In an additional aspect, when the frame is in the upright position, the first left stopper and the first right stopper are vertically higher than the second left stopper and the second right stopper.

In a further aspect, the first angle equals the second angle and the first amount equals the second amount.

In an additional aspect, a rack is connected to the shock tower. The rack defines a central aperture. A pin is operatively connected to the frame and is selectively movable inside the central aperture. The pin locks the frame in the upright position when the pin is received inside the central aperture.

In a further aspect, an electric motor is connected to the pin and is adapted to selectively move the pin.

In an additional aspect, the rack has a left ratchet surface and a right ratchet surface. The pin is further selectively movable to abut the left and right ratchet surfaces when the frame is pivoted left and right respectively relative to the shock tower. When the pin abuts the left ratchet surface, the left ratchet surface prevents the frame from pivoting further toward the left and permits the frame from pivoting toward the right up to the upright position where the pin is received in the central aperture. When the pin abuts the right ratchet surface, the right ratchet surface prevents the frame from pivoting further toward the right and permits the frame from pivoting toward the left up to the upright position where the pin is received in the central aperture.

In a further aspect, the vehicle is a snowmobile. The rear portion of the frame includes a tunnel. The front left ground engaging member is a left ski. The front right ground engaging member is a right ski. The rear ground engaging member is an endless track disposed at least in part under the tunnel. The leg of the front left suspension assembly is a left ski leg. The leg of the front right suspension assembly is a right ski leg.

In an additional aspect, the left ski is selectively movable relative to the left ski leg along a longitudinal axis of the left ski. The right ski is selectively movable relative to the right ski leg along a longitudinal axis of the right ski.

In a further aspect, the second end of the lower suspension arm of each of the front left suspension assembly and the front right suspension assembly is selectively movable relative to the first end of the lower suspension arm in a longitudinal direction of the vehicle.

In an additional aspect, the second end of the lower suspension arm of each of the front left suspension assembly and the front right suspension assembly is selectively movable relative to the first end of the lower suspension arm in a longitudinal direction of the vehicle.

In a further aspect, the motor is an internal combustion engine. An exhaust pipe is fluidly connected to the engine. At least a portion of the exhaust pipe extends forwardly of the shock tower.

In an additional aspect, the endless drive track has a generally arcuate lateral profile.

In a further aspect, a radius of curvature of an arc passing through lateral edges of ground contacting surfaces of one of the left and right skis is approximately equal to or equal to a radius of curvature of the arcuate lateral profile of the endless drive track.

In an additional aspect, fairings are connected to the frame. When the second left stopper abuts the other one of the frame and the lower suspension arm of the front left suspension assembly, a lowest part of the fairings when the frame has pivoted left is disposed vertically higher than a line passing through a lowest point of the front left ground engaging member and a lowest point of the front right ground engaging member when the frame has pivoted left. When the second right stopper abuts the other one of the frame and the lower suspension arm of the front right suspension assembly, a lowest part of the fairings when the frame has pivoted right is disposed vertically higher than a line passing through a lowest point of the front left ground engaging member and a lowest point of the front right ground engaging member when the frame has pivoted right.

In a further aspect, when the second left stopper abuts the other one of the frame and the lower suspension arm of the front left suspension assembly and the handlebar is turned to steer the skis toward the left, a rear end of the left ski is received in a left recess defined in a left side of the snowmobile. When the second right stopper abuts the other one of the frame and the lower suspension arm of the front right suspension assembly and the handlebar is turned to steer the skis toward the right, a rear end of the right ski is received in a right recess defined in a right side of the snowmobile.

In an additional aspect, a left side panel is connected to the frame rearward of the shock absorber of the front left suspension assembly, and a right side panel is connected to the frame rearward of the shock absorber of the front right suspension assembly. The left recess is disposed rearward of the shock absorber of the front left suspension assembly and forward of the left side panel. The right recess is disposed rearward of the shock absorber of the front right suspension assembly and forward of the right side panel.

In a further aspect, when one of the first left stopper and the first right stopper abuts the other one of the frame and the shock tower, the steering column is disposed laterally outward of a triangle formed by connection points of the shock absorbers with the shock tower and the pivot axis.

In an additional aspect, at least one blade is connected to at least one side of each of the left and right skis. The blades extend below the floatation surfaces of the left and right skis.

In a further aspect, when the frame is in the upright position and the skis are steered in a straight ahead direction, the blades are parallel to a pivot axis of the steering column.

In an additional aspect, a pitman arm is connected to the steering column. The pitman arm is pivotable with the steering column about a pivot axis of the steering column. Steering rods connect the pitman arm to the legs. The steering axes of the legs are parallel to the pivot axis of the steering column when the frame is in the upright position.

In a further aspect, for each of the front left suspension assembly and the front right suspension assembly the first end of the upper suspension arm is pivotally connected to the frame about an upper suspension arm pivot axis and the first end of the lower suspension arm is pivotally connected to the frame about a lower suspension arm pivot axis. The upper suspension arm pivot axes and the lower suspension arm pivot axes are perpendicular to the pivot axis of the steering column.

In an additional aspect, when the second left stopper abuts the other one of the frame and the lower suspension arm of the front left suspension assembly, a center of gravity of the snowmobile is disposed to a left of a contact point between the left ski and a ground. When the second right stopper abuts the other one of the frame and the lower suspension arm of the front right suspension assembly, the center of gravity of the snowmobile is disposed to a right of a contact point between the right ski and the ground.

For purposes of this application, terms related to spatial orientation such as forwardly, rearwardly, upwardly, downwardly, left, and right, are as they would normally be understood by a driver of the vehicle sitting thereon in a normal riding position. Also, the term "ground engaging member" refers to a component of a vehicle making contact with the ground and on which the vehicle is displaced. Examples of ground engaging members include, but are not limited to, skis, wheels and endless tracks.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

A leaning snowmobile 10 will be described below. It should be understood that aspects of the leaning snowmobile 10 could be applied to other types of leaning vehicles having three or more ground engaging members such as, but not limited to, a three-wheeled vehicle having left and right front wheels and one laterally centered rear wheel.

Figure 1:
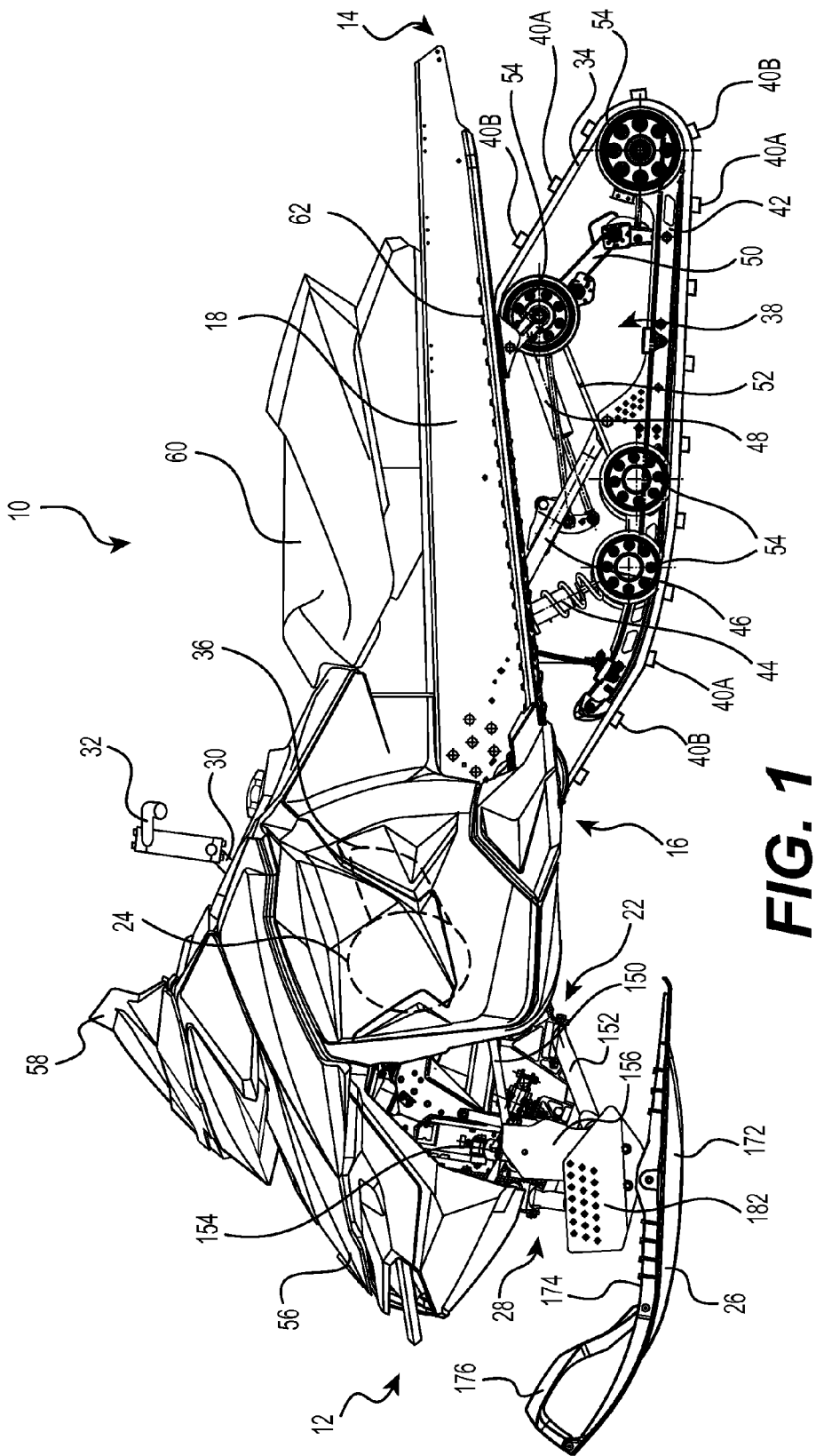
FIG. 1 is a left side elevation view of a leaning snowmobile.
Figure 2:
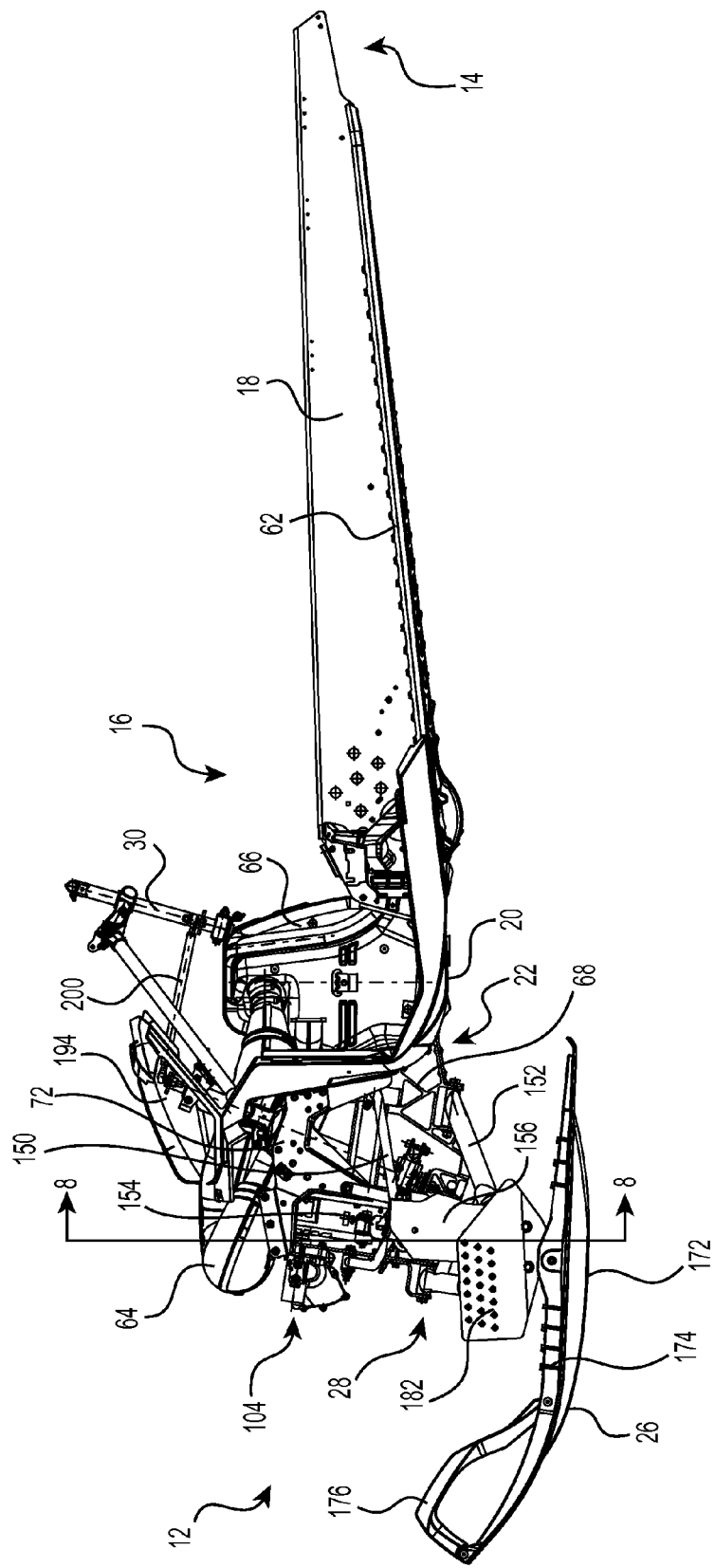
FIG. 2 is a left side elevation view of a frame, front suspension assemblies, skis and exhaust system of the snowmobile of FIG. 1.
Figure 3:
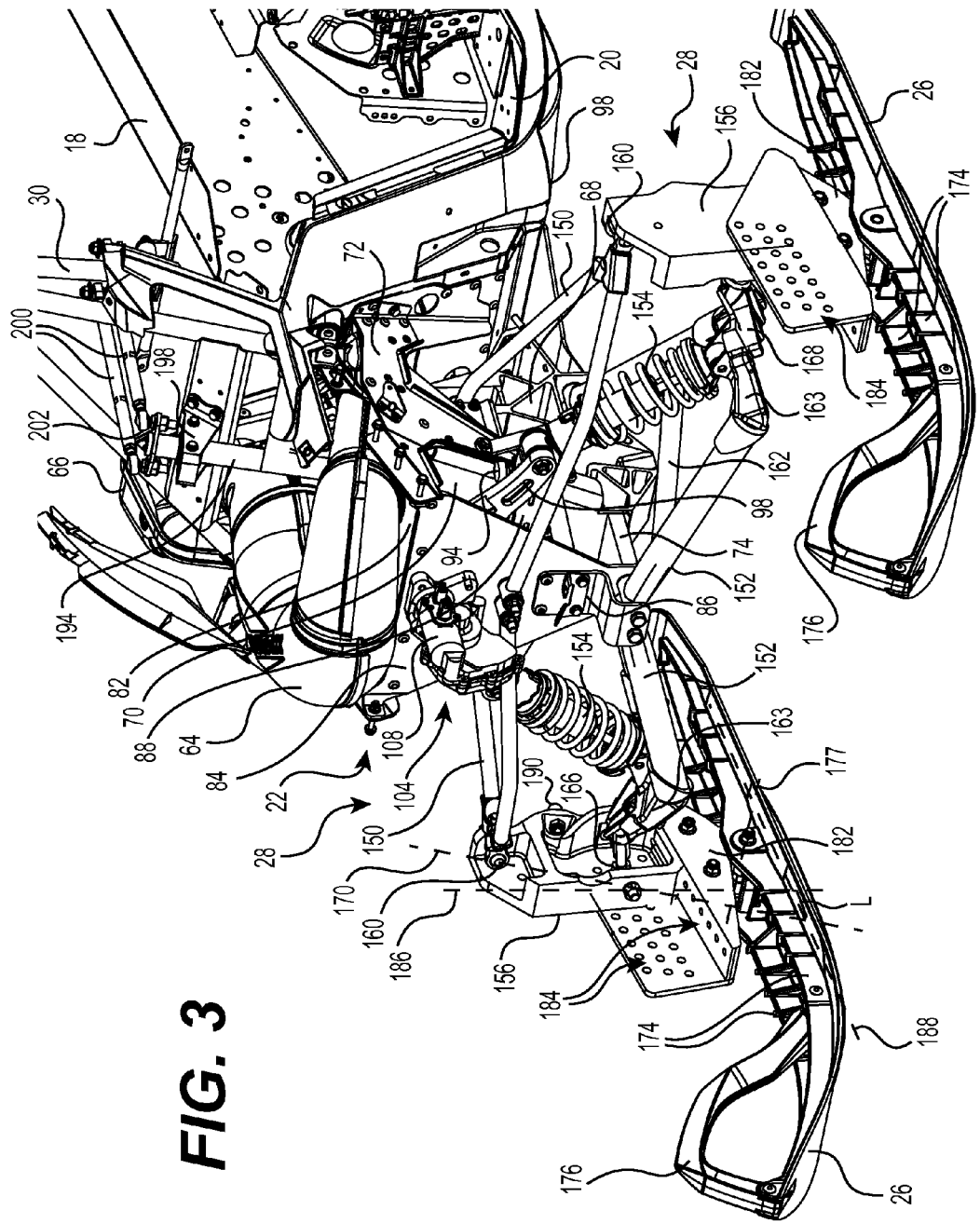
FIG. 3 is a perspective view taken from a front left side of a front portion of the snowmobile components of FIG. 2.

Referring to FIG. 1, the snowmobile 10 will be described. The snowmobile 10 has a front end 12 and a rear end 14, which are defined consistently with the forward travel direction of the snowmobile. The snowmobile 10 has a frame 16 that includes a tunnel 18, an engine cradle portion 20 (FIG. 2) and a front suspension assembly portion 22. A motor, which in the present embodiment is an engine 24 that is schematically illustrated in FIG. 1, is carried by the engine cradle portion 20 of the frame 16. The engine 24 is a two-stroke, two-cylinder internal combustion engine having two-cylinders, but it is contemplated that the engine 24 could be any type of motor, such as, for example, a four-stroke internal combustion engine or an electric motor. A ski and steering assembly is provided, in which two skis 26 are positioned at the front end 12 of the snowmobile 10, and are attached to the front suspension assembly portion 22 of the frame 16 through front suspension assemblies 28 that will be described in greater detail below. The skis 26 are operatively connected to a steering assembly including a steering column 30 and a handlebar 32 as will be described in greater detail below.

An endless drive track 34 is positioned at the rear end 14 of the snowmobile 10 and is disposed under the tunnel 18. The endless drive track 34 is operatively connected to the engine 24 through a reduction drive (not shown) and a belt transmission system 36 which is schematically illustrated by broken lines. In one example, the belt transmission system 36 is a continuously variable transmission (CVT). Drive sprockets (not shown) disposed at a front of the tunnel 18 inside the drive track 34 are driven by the reduction drive and engage drive lugs 37 (FIG. 12) extending from an inner surface of the drive track 34 and/or apertures (not shown) formed along the length of the drive track 34. Thus, the endless drive track 34 is driven to run about a rear suspension assembly 38 for propulsion of the snowmobile 10. Terrain lugs 40A, B (only some of which have been labeled for clarity) are disposed circumferentially about the outer side of the drive track 34 to provide traction to the drive track 34. Although one embodiment is provided, the specific distribution pattern and dimensions of the terrain lugs will vary depending on the application and desired characteristics of the drive track 34. The drive track 34 will be described in greater detail below. The rear suspension assembly 38 is connected to the tunnel 18. The rear suspension assembly 38 includes a pair of slide rails 42, a front transverse shaft (not shown) connected to the tunnel 18, a shock absorber 44 connected between the front transverse shaft and the slide rails 42, and front suspension arms 46 connected between the front transverse shaft and the slide rails 42. The rear suspension assembly 38 also includes a rear transverse shaft (not shown) connected to the tunnel 18, a shock absorber 48 connected between the rear transverse shaft and the slide rails 42, rear suspension arms 50 connected between the rear transverse shaft and the slide rails 42, and torsion springs 52 (only partially shown) disposed around the rear transverse shaft and having an end supported by the slide rails 42. A number of wheels 54 are connected to the slide rails 42 and the front and rear transverse shaft and roll along the inner surface of the endless drive track 34 when the snowmobile 10 is in movement. The above-described rear suspension assembly 38 is one possible embodiment of a rear suspension assembly that can be used with the snowmobile 10. It is contemplated that other embodiments of rear suspension assemblies can be used with the snowmobile 10.

At the front end 12 of the snowmobile 10, there are provided fairings 56 that enclose the engine 24, the reduction drive and the belt transmission system 36, thereby providing an external shell that not only protects these components, but also make the snowmobile 10 more aesthetically pleasing. The fairings 56 include one or more panels that can be opened to allow access to the engine 24, the reduction drive, the belt transmission system 36 and other components of the snowmobile 10 disposed inside the fairings 56. A windshield 58 is connected to the fairings 56 near the front end 12 of the snowmobile 10, or may alternatively be attached directly to the handlebar 32. The windshield 58 acts as a windscreen to lessen the force of the air on the rider while the snowmobile 10 is moving.

A seat 60 is connected to and disposed on the tunnel 18. Two footrests 62 extend laterally from the tunnel 18 on opposite sides of the snowmobile 10 below the seat 60 to accommodate the rider's feet.

The engine 24 receives fuel from a fuel supply system (not shown) including a fuel tank and fuel injectors. Air is supplied to the engine 24 by an air intake system (not shown) including an airbox, a throttle body disposed downstream of the air box, and an air intake manifold fluidly communicating the throttle body with air intake ports (not shown) of the engine 24 disposed on a rear side thereof. Other embodiments of air intake systems are contemplated. For example, one throttle body could be provide per cylinder of the engine 24, and as such the air intake manifold would be omitted and, if necessary, replaced by one air intake pipe per cylinder for fluidly communicating each throttle body to its corresponding air intake port. Exhaust gases exit the engine 24 via the exhaust ports (not shown) of the engine 24 disposed on a front side thereof. From the exhaust ports, the exhaust gases flow into an exhaust manifold (not shown), then into an exhaust pipe in the form of a tuned pipe 64 (FIG. 2), a muffler 66 (FIG. 2) and finally out to the atmosphere. As can be seen in FIGS. 2 to 10, the tuned pipe 64 is generally U-shaped and extends in part over the suspension assembly portion 22. The muffler 66 is disposed on a right side of the engine cradle 20. Other embodiments of exhaust systems are contemplated.

Turning now to FIGS. 2 to 10, the suspension assembly portion 22 will be described in more detail. The suspension assembly portion 22 has a metallic extruded frame member 68 fastened to the front of the engine cradle 20. The extruded frame member 68 is laterally centered. It is contemplated that the extruded frame member 68 could be replaced by a plurality of beams, tubes and/or brackets that are fastened, bonded or welded together. A sheet metal plate 70 is disposed forward of the extruded frame member 68 and is fastened along its top to the extruded frame member 68. Side plates 72 are fastened to the left and right sides of the extruded frame member 68 and to the front of the engine cradle 20. The plate 70 has side tabs disposed between the side plates 72 and the extruded frame member 68 and as such the tabs are fastened to the extruded frame members 68 by the fasteners used to fasten the side plates to the extruded frame member 68. The lower portion of the plate 70 is disposed between a beam 74 and the extruded frame member 68. The beam 74 is fastened to the extruded frame member 68 by fasteners passing though the lower portion of the plate 70. A triangular member 76 (FIG. 7) is fastened to the front of the upper part of the plate 70 and is laterally centered. Left and right stopper holders 78 are fastened to the side plates 72 and the side tabs of the plate 70 on either side of the suspension assembly portion 22. Left and right stoppers 80 are fastened to and extend downwardly from their respective stopper holders 78. It is contemplated that the stoppers 80 could be integrally formed with the stopper holders 78 or some other portion of the suspension assembly portion 22. In the illustrated embodiment, the stoppers 80 have a cylindrical metal core with a rubberized outer shell, but other types of stoppers are contemplated. A sheet metal top plate 82 is fastened between the upper forward portions of the side plates 72. A sheet metal front plate 84 is fastened along its upper edge to the front of the top plate 82 and along its lower edge to the front of the beam 74. As can be seen, the front plate 84 is spaced from the plate 70. The front plate 84, the plate 70, the beam 74 and the top plate 82 define a cavity therebetween. A bracket 86 is fastened to the lower portion of the front plate 84 and has a tab that is longitudinally spaced from the front plate 84. It is contemplated that the components of the suspension assembly portion 22 could be made of materials other than metal. For example, it is contemplated that at least some the components of the suspension assembly portion 22 could be made of plastic or composite material. It is also contemplated that at least some of the components of the suspension assembly portion 22 could be bonded, welded or integrally formed with each other instead of being fastened. It is also contemplated that one or more of the plates 70, 82, 84 could be replaced by one or more beams, tubes and/or brackets that are fastened, bonded or welded together.

Figure 4:
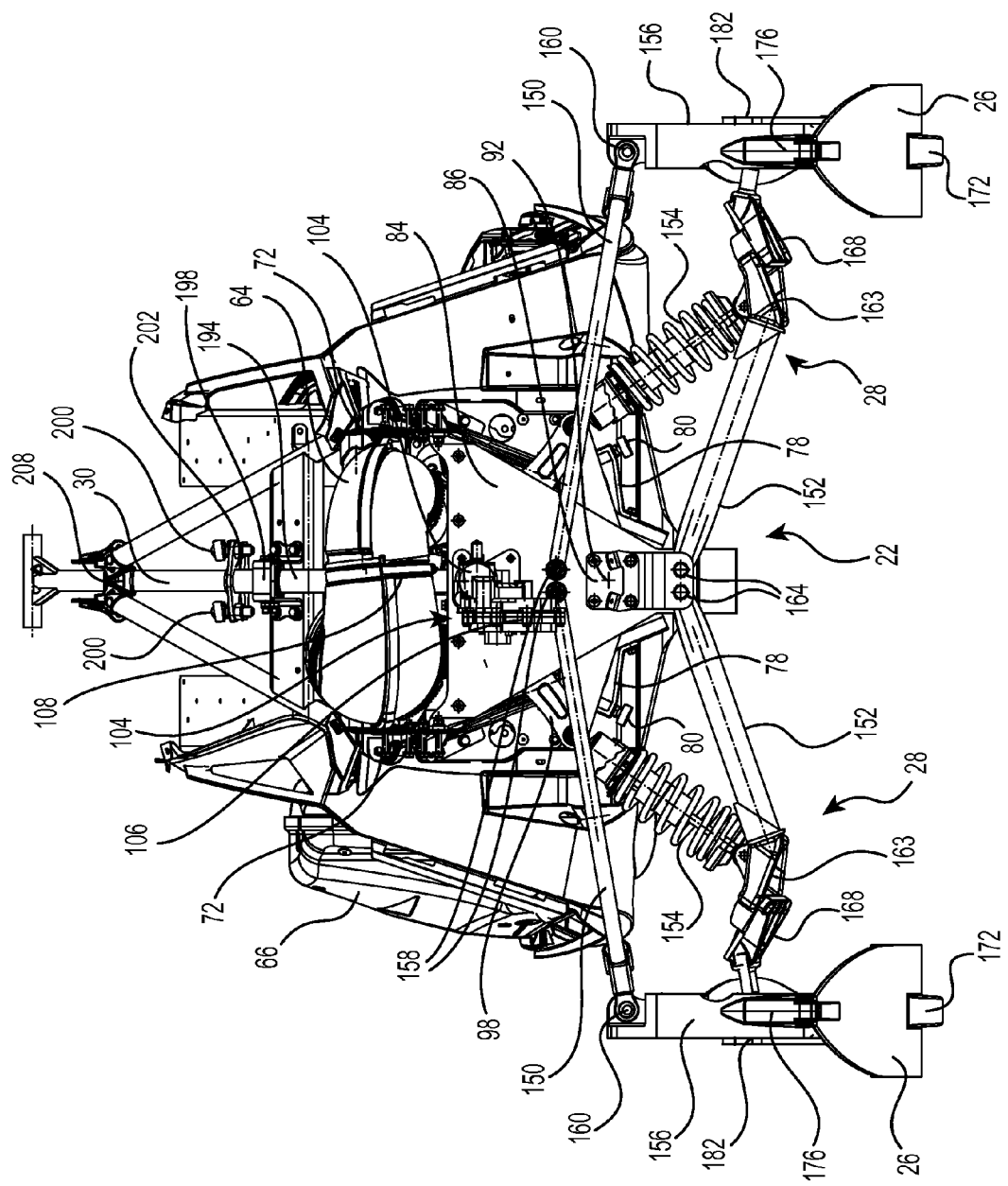
FIG. 4 is a front elevation view of the snowmobile components of FIG. 2.
Figure 5:
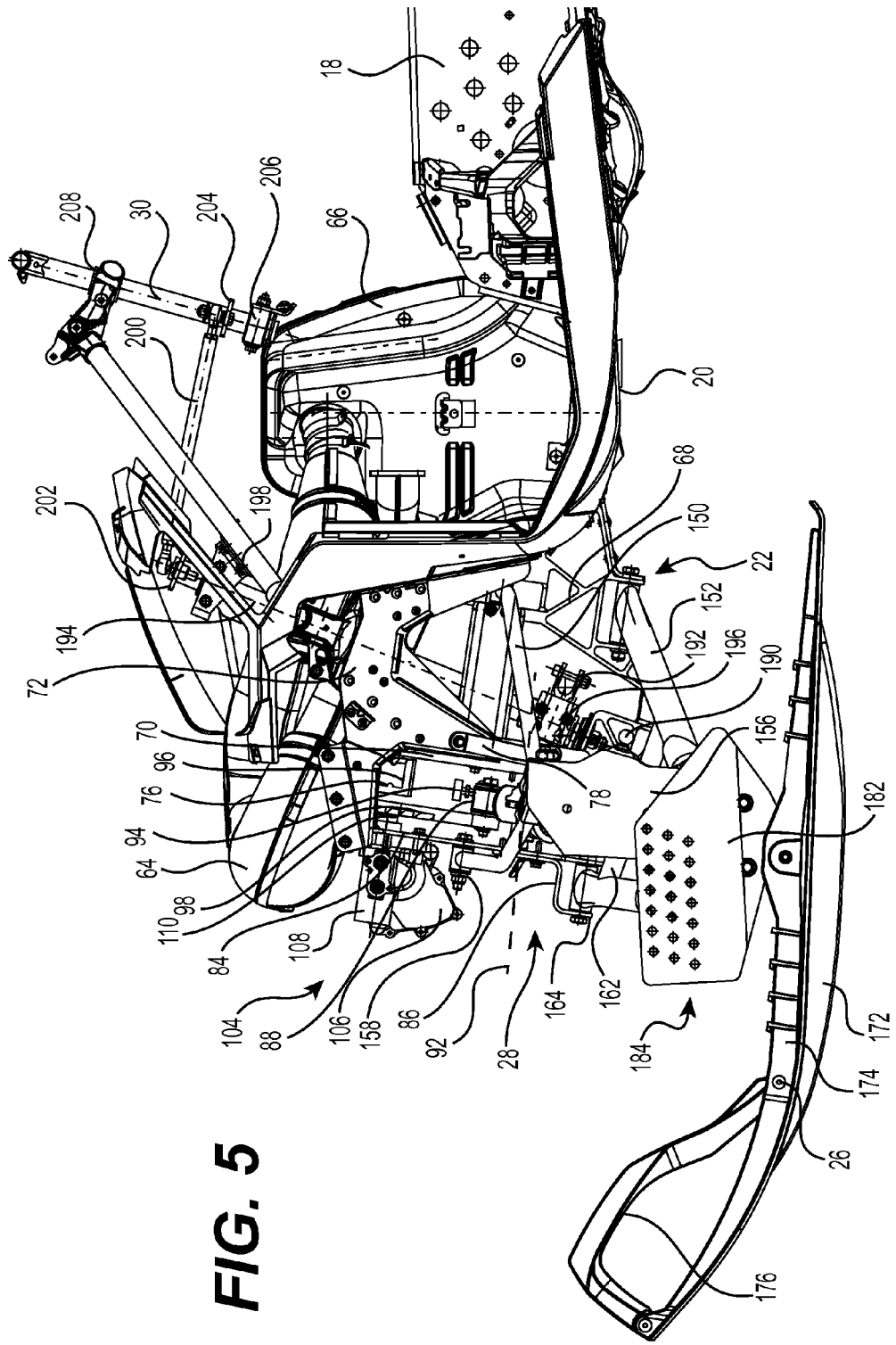
FIG. 5 is a left side elevation view of a front portion of the snowmobile components of FIG. 2.
Figure 6:
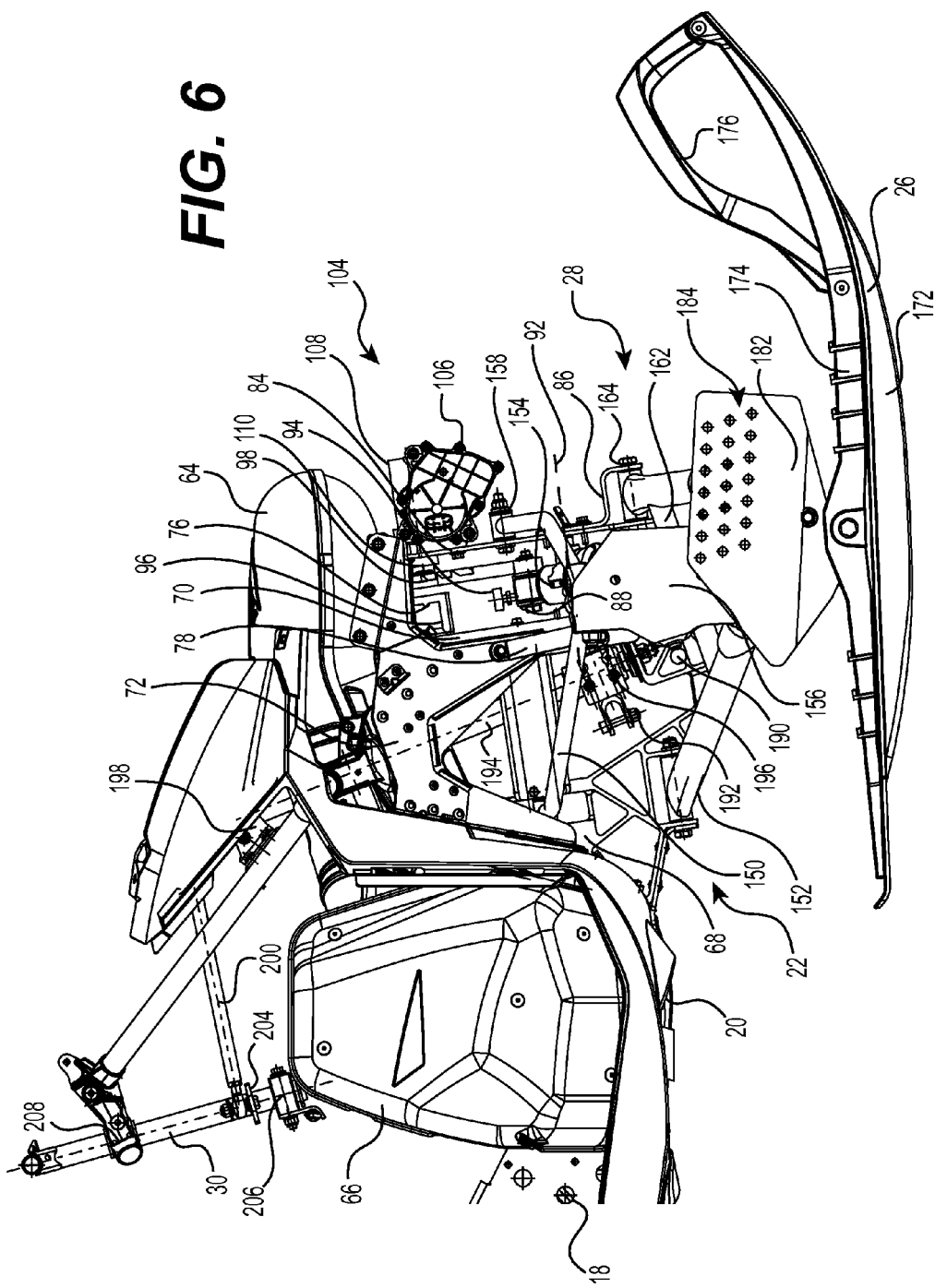
FIG. 6 is a right side elevation view of a front portion of the snowmobile components of FIG. 2.
Figure 7:
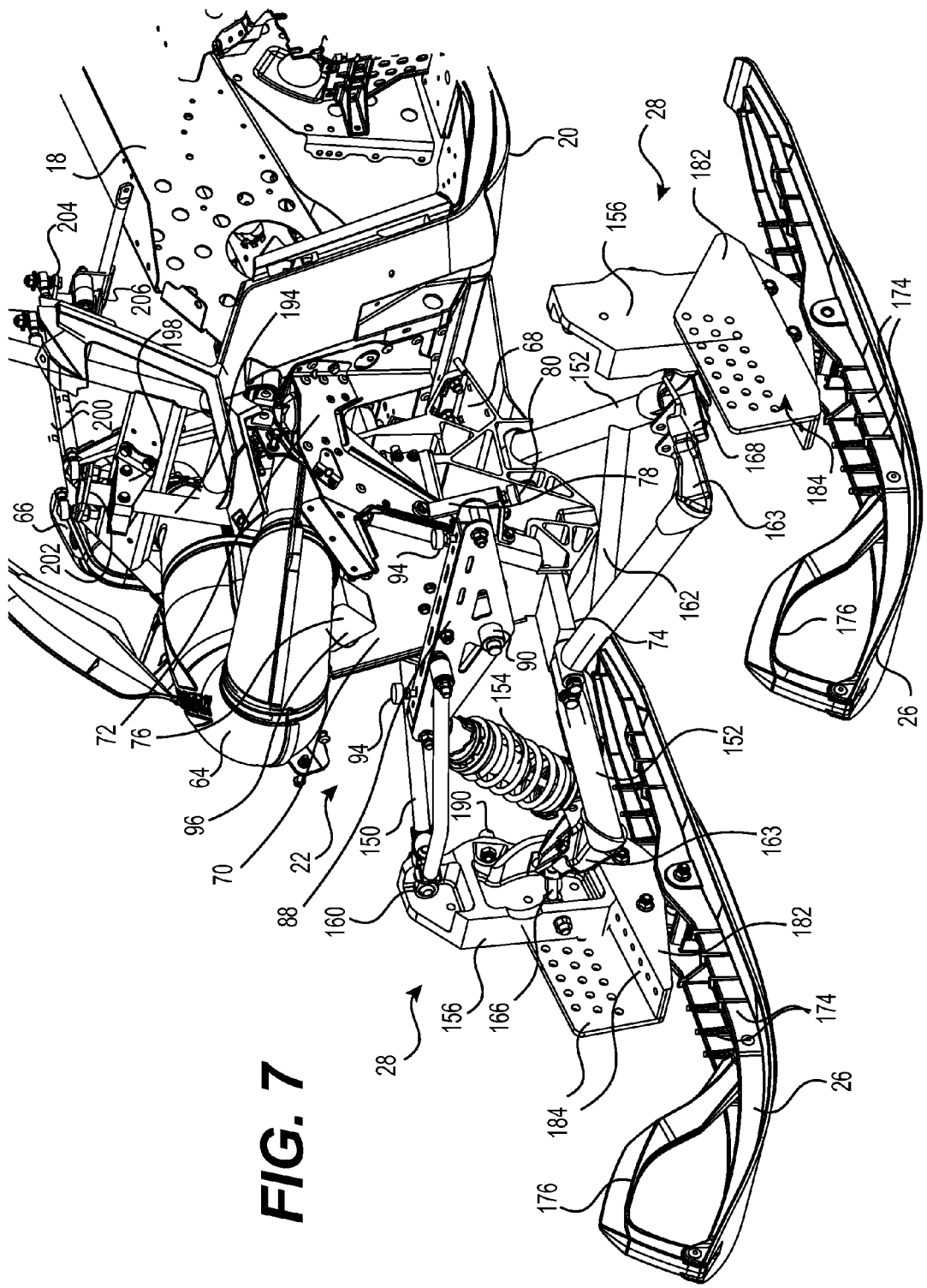
FIG. 7 is a perspective view taken from a front left side of a front portion of the snowmobile components of FIG. 2, with a portion of the frame and of the left suspension assembly removed.

A shock tower 88 is disposed between the plates 70 and 84. As can be seen in FIGS. 5 and 6, a portion of the tuned pipe 64 extends forwardly of the shock tower 88. The shock tower 88 is fixedly mounted onto a shaft 90 (FIG. 7). The ends of the shaft 90 are disposed inside bearings (not shown). The front bearing is received in an aperture (not shown) in the plate 84 and the rear bearing is received in an aperture (not shown) in the plate 70. As a result, and as will be described in greater detail below, the shaft 90 and the shock tower 88 can pivot about a pivot axis 92 relative to the frame 16 of the snowmobile 10. The pivot axis 92 is laterally aligned with the longitudinal centerline of the snowmobile 10 when the frame 16 is in an upright position (i.e. the position of the frame 16 shown in FIGS. 2 to 8). The shock tower 88 is generally triangular in shape, but other shapes are contemplated. For example, the shock tower 88 could be generally T-shaped with a horizontal bar of the T being at a top of the shock tower 88. As best seen in FIG. 7, left and right stoppers 94 are fastened to the top of the shock tower 88. The stoppers 94 are positioned along the top of the shock tower 88 such that when the frame 16 leans by a predetermined angle relative to the shock tower 88, the corresponding stopper 94 (i.e. the left stopper 94 when the frame 16 leans left and the right stopper 94 when the frame 16 leans right) makes contact with a corresponding one of the contact surfaces 96 (FIG. 7) defined by the triangular member 76, as will be described in greater detail below. In the illustrated embodiment, the stoppers 94 have a cylindrical metal core with a rubberized outer shell, but other types of stoppers are contemplated. It is contemplated that the stoppers 94 could be integrally formed with the shock tower 88. It is also contemplated that the stoppers 94 could be connected to the triangular member 76, or some other portion of the suspension assembly portion 22, and that the contact surfaces 96 could be defined on the shock tower 88. As can be seen in FIG. 7, when the frame 16 is in the upright position as shown, the stoppers 94 are vertically higher than the stoppers 80.

Figure 8:
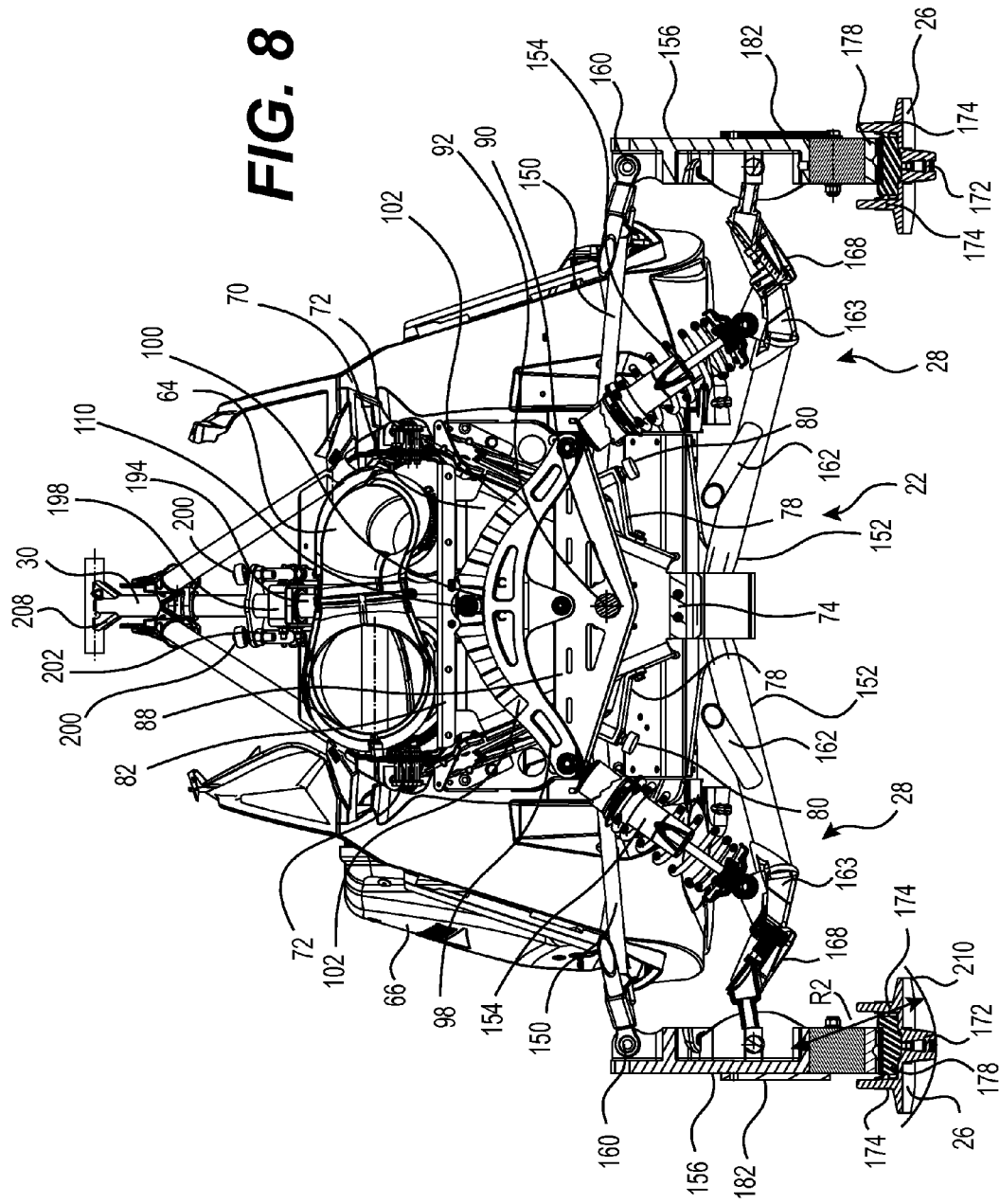
FIG. 8 is a cross-sectional view of the snowmobile components of FIG. 2 taken through line 8-8 of FIG. 2.

A rack 98 is disposed between the plates 70 and 84 and is fastened to the front of the shock tower 88 as shown in FIG. 8. As such, the rack 98 is fixed relative to the shock tower 88. As can also be seen in FIG. 8, the rack 98 has a central aperture 100 located at a lateral center of the rack 98 at a top thereof. The rack 98 also has left and right forwardly facing ratchet surfaces 102 on either sides of the central aperture 100. The central aperture 100 and the ratchet surfaces 102 generally define an arc having the pivot axis 92 as a center of curvature.

Figure 9:
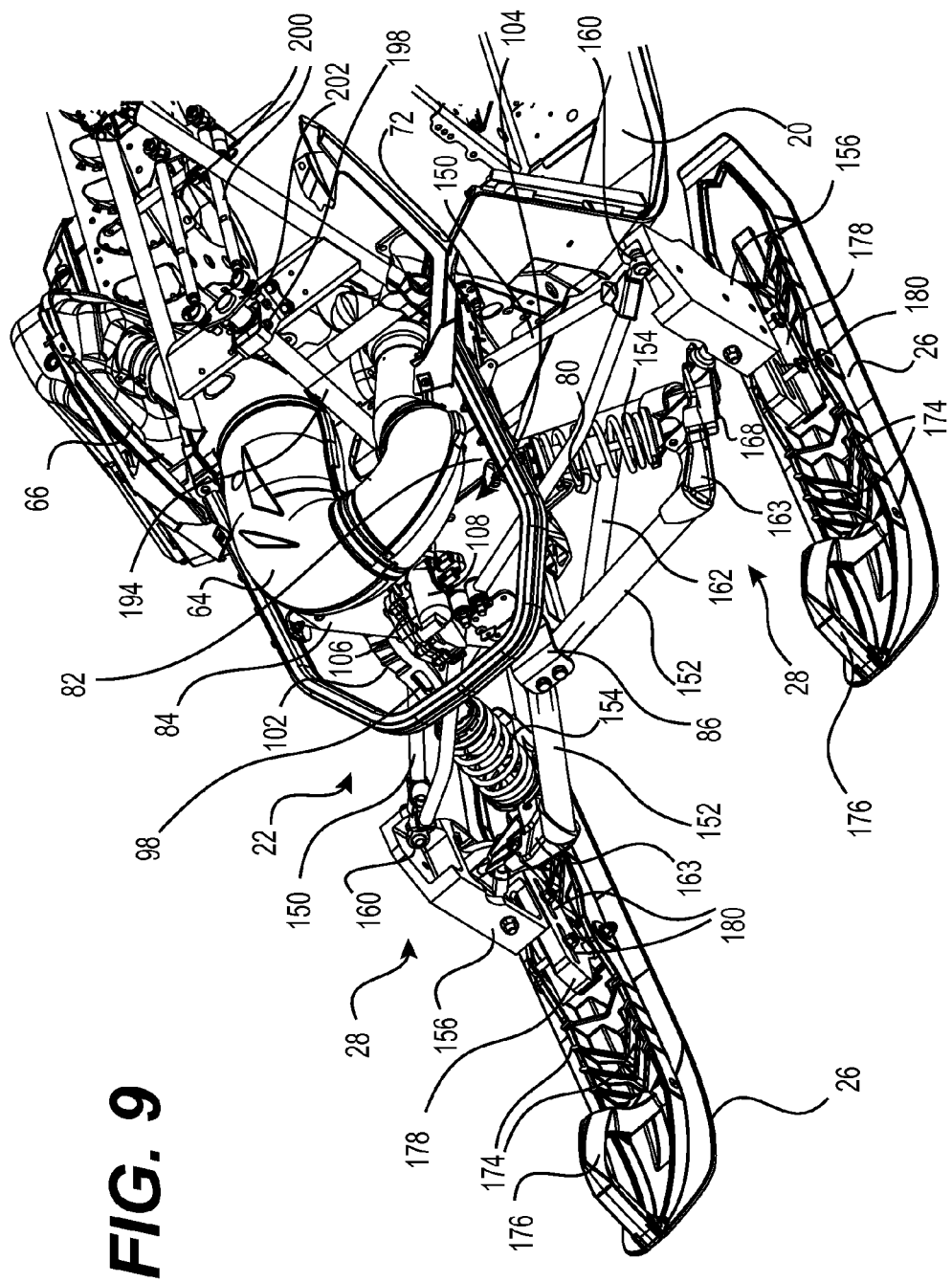
FIG. 9 is a perspective view taken from a front left side of a front portion of the snowmobile components of FIG. 2 shown leaning toward a left side.
Figure 10:
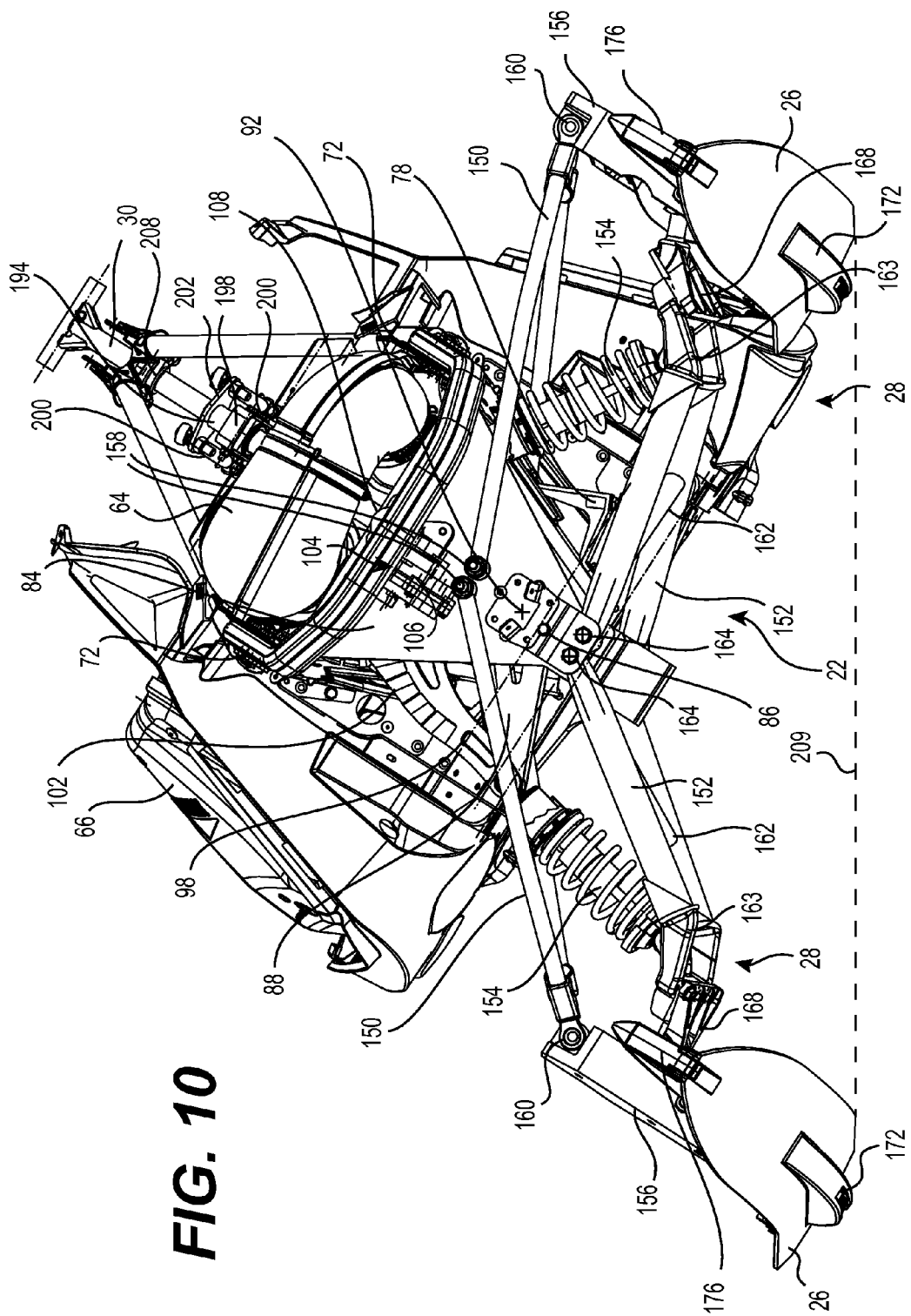
FIG. 10 is a front elevation view of the snowmobile components of FIG. 2 shown leaning toward a left side.

A locking mechanism 104 is mounted onto the front of the plate 84. The locking mechanism 104 includes an electric motor 106, a cylinder 108 and a pin 110 (FIG. 8). The pin 110 is slidably received in the cylinder 108 and passes through an aperture (not shown) in the plate 84 in alignment with the central aperture 100 of the rack 98 when the frame 16 is in the upright position. The electric motor 106 selectively slides the pin 110 rearward such that the pin 110 can be received in the central aperture 100 of the rack 98 when the frame 16 is in the upright position. When the pin 110 is received in the central aperture 100 of the rack 98, the frame 16 is locked in the upright position and cannot pivot relative to the shock tower 88. When the frame 16 is pivoted from the upright position relative to the shock tower 88 and the electric motor 106 slides the pin 110 rearwardly such that the pin 110 abuts one of the ratchet surfaces 102, the interaction between the pin 110 and the ratchet surface 102 it abuts prevents the frame 16 from pivoting further away from the upright position, but permits the frame 16 to pivot back to the upright position such that the pin 110 can be received in the central aperture 100, thereby locking the frame 16 in the upright position. For example, when the frame 16 is pivoted to the left relative to the shock tower 88 as shown in FIGS. 9 and 10 and the electric motor 106 slides the pin 110 rearward to abut the left ratchet surface 102, the frame 16 is prevented from pivoting further towards the left relative to the shock tower 88, but can be pivoted toward the right relative to the shock tower 88 up to the upright position. When the electric motor 106 slides the pin 110 forwardly such that the pin 110 is not received in the central aperture 100 and does not abut a ratchet surface 102 of the rack 98, the frame 16 is free to lean relative to the shock tower 88 until one of the stoppers 94 makes contact with its corresponding contact surface 96 as will be discussed in greater detail below. It is contemplated that the electric motor 106 could be replaced by another type of actuator, such as, but not limited to, a hydraulic actuator or a solenoid. It is also contemplated that the rack 98 could be connected to the rear side of the shock tower 88, with the ratchet surfaces 102 facing rearwardly and the locking mechanism 104 mounted to a rear surface of the plate 70.

It is contemplated that the electric motor 106, and therefore the position of the pin 110, can be controlled by a switch, buttons or any other input means to be actuated by the driver of the snowmobile 10. As a result, the driver of the snowmobile 10 can decide to operate the snowmobile 10 as a leaning vehicle by unlocking the frame 16 from the shock tower 88 or to operate the snowmobile 10 as a more typical steer-in-direction snowmobile by locking the frame 16 relative to the shock tower 88. It is also contemplated that the electric motor 106 could be controlled to automatically move the pin rearward when the snowmobile 10 is operated below a predetermined speed or stopped.

The right front suspension assembly 28 will now be described in more detail. The left front suspension assembly 28 is a mirror image of the right front suspension assembly 28 and will therefore not be described in detail herein. Elements of the left front suspension assembly 28 corresponding to elements of the right front suspension assembly 28 have been labeled with the same reference numerals in the figures.

The right front suspension assembly 28 has upper and lower suspension arms 150, 152, a shock absorber 154 and a ski leg 156.

The upper suspension arm 150 is made of two arms connected at their distal ends to form a generally V-shape. The proximal end of the rear arm of the upper suspension arm 150 is pivotally connected about an upper suspension arm pivot axis 158 in a recess formed in the extruded frame member 68. The proximal end of the front arm of the upper suspension arm 150 is pivotally connected about the upper suspension arm pivot axis 158 to the front of plate 84 above the bracket 86. The upper suspension arm pivot axis 158 is parallel to the pivot axis 92 and, as best seen in FIG. 4, is slightly laterally offset from the pivot axis 92 when the frame 16 is in the upright position. A ball joint 160 is connected to the distal ends of the two arms of the upper suspension arms 150. A fastener connects the ball joint 160 to an upper portion of the ski leg 156 such that the upper suspension arm 150 is pivotally connected to the ski leg 156. More specifically, the ball joint 160 is connected to a rear wall of the ski leg 156.

The lower suspension arm 152 is made of two arms and a cross-member 162 connected between these two arms. The two arms are connected at their distal ends by a connector 163 to form a generally V-shape. The proximal end of the rear arm of the lower suspension arm 152 is pivotally connected about a lower suspension arm pivot axis 164 in a recess formed in the extruded frame member 68. The proximal end of the front arm of the lower suspension arm 152 is pivotally connected about the lower suspension arm pivot axis 164 between the front of plate 84 and the tab of the bracket 86. The lower suspension arm pivot axis 164 is parallel to the pivot axis 92 and, as best seen in FIG. 4, is slightly laterally offset from the pivot axis 92 when the frame 16 is in the upright position. The cross-member 162 and its corresponding stopper 80 are arranged such that the cross-member provides a contact surface for the stopper 80 to abut under certain conditions as will be described in greater detail below. It is contemplated that the stopper 80 could be attached on the cross-member 162 and that a contact surface could be provided on the frame 16 at the position where the stopper 80 is shown in the figures. A ball joint 166 (FIG. 17) is connected to the connector 163 of the lower suspension arms 152 via a connector 168 (FIG. 4). A fastener connects the ball joint 166 to a portion of the ski leg 156 that is vertically below and forward of the ball joint 160 such that the lower suspension arm 152 is pivotally connected to the ski leg 156. More specifically, the ball joint 166 is connected to a front wall of the ski leg 156. The connectors 163 and 168 each have a plurality of apertures used to fasten the two together. These apertures allow the longitudinal position of the connector 168 to be changed, which in turn changes the longitudinal position of the ball joint 166. Changing the position of the ball joint 166 changes the caster angle of the ski leg 156. The caster angle is the angle between the vertical and a line 170 (FIG. 3) passing through the center of both ball joints 160, 166. It is contemplated that the longitudinal position of the lower ball joint 166 could be modified in other ways. For example, the aperture in one or both of the connectors 163, 168 could be replaced with slots. It is also contemplated that the longitudinal position of the upper ball joint 160 could be adjustable instead of or in addition to the adjustability of the lower ball joint 166.

The shock absorber 154 includes a hydraulic damper around which is disposed a coil spring. The lower end of the shock absorber 154 is pivotally connected to a bracket integrally formed with the connector 163 of the lower suspension arm 152. The upper end of the shock absorber 154 is pivotally connected to the corresponding distal end of the shock tower 88. As can be seen in FIG. 7 for the left end of the shock tower 88, a space is formed between the front and rear walls of the shock tower 88 at its distal end to receive the upper end of the shock absorber 154. As can be seen in FIG. 4 for example, the lower end of the shock absorber 154 is located laterally outwardly of its upper end.

The right ski 26 and its connection to the right ski leg 156 will now be described in more detail. The left ski 26 and its connection to the left ski leg 156 are a mirror image of the right ski 26 and its connection to the right ski leg 156 and will therefore not be described in detail herein. Elements of the left ski 26 and its connection to the left ski leg 156 corresponding to elements of the right ski 26 and its connection to the right ski leg 156 have been labeled with the same reference numerals in the figures.

The ski 26 has an upturned front portion, a keel 172 laterally centered on the bottom of the ski 26, two ribs 174 extending longitudinally on the top of the ski 26, and a handle 176 connected to the upturned portion between the ribs 174. It is contemplated that other types of snowmobile skis could be used.

The ski 26 is pivotally connected about a pivot axis 177 (FIG. 3) to a first ski connector 178 (FIG. 9) by a fastener. As can be seen, the first ski connector is received between the ribs 174 and is fastened to the ski 26 near the longitudinal center of the ski 26. As can be seen in FIG. 9, the first ski connector 178 has two longitudinal slots 180. A second ski connector 182 is disposed over the first ski connector 178 and is connected to it by fasteners passing through the slots 180. The second ski connector 182 has an L-shaped portion adapted to abut the bottom and outer surfaces of the ski leg 156. The second ski connector 182 has a number of apertures 184 that permit connection to the ski leg 156 at a number of different positions. The apertures 184 and slots 182 allow the ski 26 to be selectively moved relative to the ski leg 156 along the longitudinal axis of the ski 26. The apertures 184 permit "macro" adjustment, while the slots 182 permit a more precise "micro" adjustment of the position of the ski 26 relative to the ski leg 156. It is contemplated that the apertures 184 could be replaced by slots. It is also contemplated that the slots 180 could be replaced by apertures. It is also contemplated that the first and second ski connectors 178, 182 could be replaced by a single ski connector having slots or apertures. It is also contemplated that other adjustment mechanisms could be provided. For example, the slots or multiple apertures could be provided on the ski leg 156. It is contemplated that in some embodiment, the position of the ski 26 relative to the ski leg 156 could be fixed.

By changing the position of the ski 26 relative to the ski leg 156 along the longitudinal axis of the ski 26, the trail length L (FIG. 3) of the ski 26 is changed. The trail length L is the distance between the point of intersection of a vertical line 186 passing through the pivot axis 177 with the ground (line 188, FIG. 3) and the point of intersection of the caster line 170 with the ground 188. Changing the caster angle also changes the trail length L. The caster angle controls the degree of self-centering of the ski 26. The trail length L affects the handling characteristics of the snowmobile 10 (i.e. how stable the steering feels to the driver). Caster and trail length determine in part the amount of force necessary to steer the skis 26. As explained above, the snowmobile 10 can be driven as a leaning vehicle by allowing the frame 16 to pivot relative to the shock tower 88 or can be driven as a steer-in-direction vehicle by locking the frame 16 to the shock tower 88. As these are two very different driving conditions, the desired steering forces are not the same for both conditions. As such, by allowing both the caster angle and trail length to be adjusted, the steering forces required can be adjusted to best suit the selected driving condition (i.e. leaning or steer-in-direction).

To steer the skis 26, each ski leg 156 is connected to a steering rod (not shown) via a ball joint 190 (FIGS. 5 and 6) connected to the back of the ski leg 156. The proximal ends of the steering rods are connected to a pitman arm 192 (FIGS. 5 and 6) connected to the lower portion of a steering column 194. The steering column 194 is connected to the frame 16 by lower and upper brackets 196, 198 inside which it can pivot. A pair of connecting rods 200 having ball joints at both ends is connected between a flange 202 (FIG. 4) at a top of the steering column 194 and a flange 204 (FIGS. 5 and 6) near a bottom of the steering column 30, thereby transmitting steering motion between the steering columns 30 and 194. The steering column 30 is connected to the frame 16 by lower and upper brackets 206, 208 inside which it can pivot. As a result of this arrangement, when the handlebar 32, which is connected to the steering column 30, is turned in one direction, the skis 26 are turned in the same direction. It is contemplated that the steering columns 30 and 194 could be replaced by a single steering column. It is also contemplated that the snowmobile 10 could be provided with a power steering system where an actuator, such as an electric motor or a hydraulic actuator, moves the steering rods to steer the skis 26 in response to movement of the handlebar 32.

When the frame 16 is locked to the shock tower 88, the snowmobile 10 is steered by turning the handlebar 32 in the direction in which the driver wants to turn. When the frame 16 is not locked to the shock tower 88, the snowmobile 10 is steered by leaning the frame 16 relative to the shock tower 88 in the direction of the turn. To do this, the driver has to countersteer by momentarily turning the handlebar 32 in the direction opposite to the turn thereby causing a moment that leans the frame 16 into the turn. As explained above, the frame 16 pivots about the pivot axis 92. As can be seen in FIGS. 9 and 10, as the frame 16 pivots about the pivot axis 92, the shock tower 88 remains substantially vertical.

The stoppers 80 and 94 prevent the frame 16 from being pivoted too much about the pivot axis 92. An example of the use of the left stoppers 80 and 94 will now be provided for the snowmobile 10 making a left turn as shown in FIGS. 9 and 10. It should be understood that for the snowmobile 10 making a right turn, the same thing occurs but with the right stoppers 80 and 94 and their corresponding contact surfaces on the right side of the snowmobile 10.

As the frame 16 is increasingly pivoted about the pivot axis 92 toward the left relative to the shock tower 88 to make a left turn, the frame 16 eventually reaches an angle where the left contact surface 96 of the triangular member 76 makes contact with the left stopper 94 mounted on the shock tower 88. In an exemplary embodiment, this angle is between 45 and 60 degrees. Between the upright (i.e. no leaning) and the angle where the stopper 94 makes contact with the contact surface 96, the shock tower 88 remains substantially upright and the shock absorbers 154 are not compressed as a result of the leaning of the frame 16. When the left stopper 94 makes contact with the contact surface 96, the force of the impact is absorbed in part by the left shock absorber 154, thus reducing the vibrations resulting from the impact being transferred to the other components of the snowmobile 10 and to the driver and, if applicable, his passenger.

Once the left stopper 94 makes contact with the left contact surface 96, the frame 16 can continue to be pivoted toward the left, but in order to do this, the left shock absorber 154 has to be compressed. This can be done as a result of the angular momentum resulting from the initial leaning of the frame 16 relative to the shock tower 88 when the left stopper 94 made contact with the left contact surface 96 and/or by the driver shifting his weight to cause further pivoting of the frame 16. When the frame 16 is leaned after the left stopper 94 has made contact with the left contact surface 96, not only is the frame 16 pivoted but the shock tower 88 and the other components of the snowmobile 10 are also pivoted with it. As the left shock absorber 154 is compressed to provide further leaning of the snowmobile 10, the left stopper 80 moves toward the cross-member 162 of the lower left suspension arm 152 until it makes contact with it, thereby preventing any further leaning of the snowmobile 10 relative to the vertical. In an exemplary embodiment, the amount by which the left shock absorber 154 is compressed when the left stopper 80 contacts the left cross-member 162 corresponds to a 10 to 20 degrees of further leaning of the snowmobile 10 from the angle where the left stopper 94 made contact with the left contact surface 96. In an embodiment, when the left stopper 80 contacts the left cross-member 162, the lowest part of the fairings 56 is disposed vertically higher than a line 209 (FIG. 10) passing through the lowest point of each ski 26. This helps prevent the fairings 56 coming into contact with the ground (i.e. snow), which could otherwise result in the lowest part of the fairings 56 becoming a supporting structure of the snowmobile 10 thereby removing weight off the skis 26.

The stoppers 80 and 94 on the right side of the snowmobile 10 limit leaning toward the right by the same angles as the stoppers 80 and 94 on left side of the snowmobile 10 limit leaning toward the left.

It is contemplated that the stoppers 80, 94 could be useful in limiting leaning on an assisted leaning system as providing the stoppers 80, 94 would reduce strain on the leaning actuator which is often used to limit the leaning.

Figure 11:
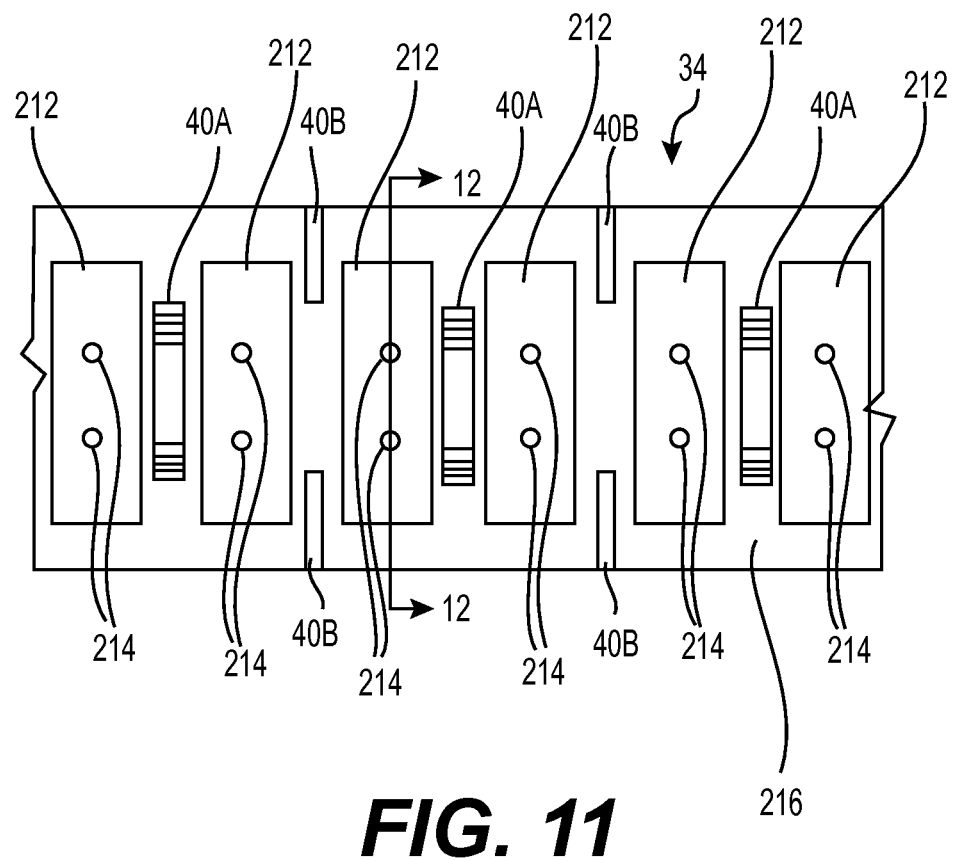
FIG. 11 is a schematic plan view of an outer portion of a track for the snowmobile of FIG. 1.
Figure 12:
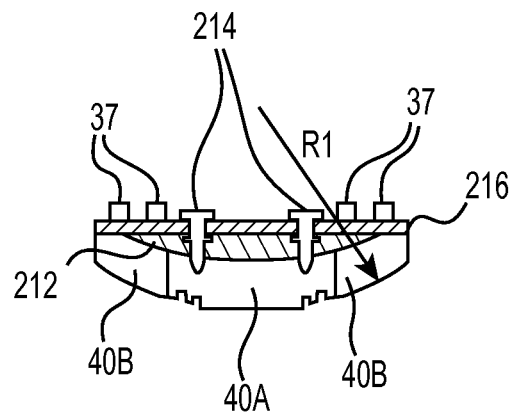
FIG. 12 is a cross-sectional view of the track of FIG. 11 taken through line 12-12 of FIG. 11.
Figure 13:
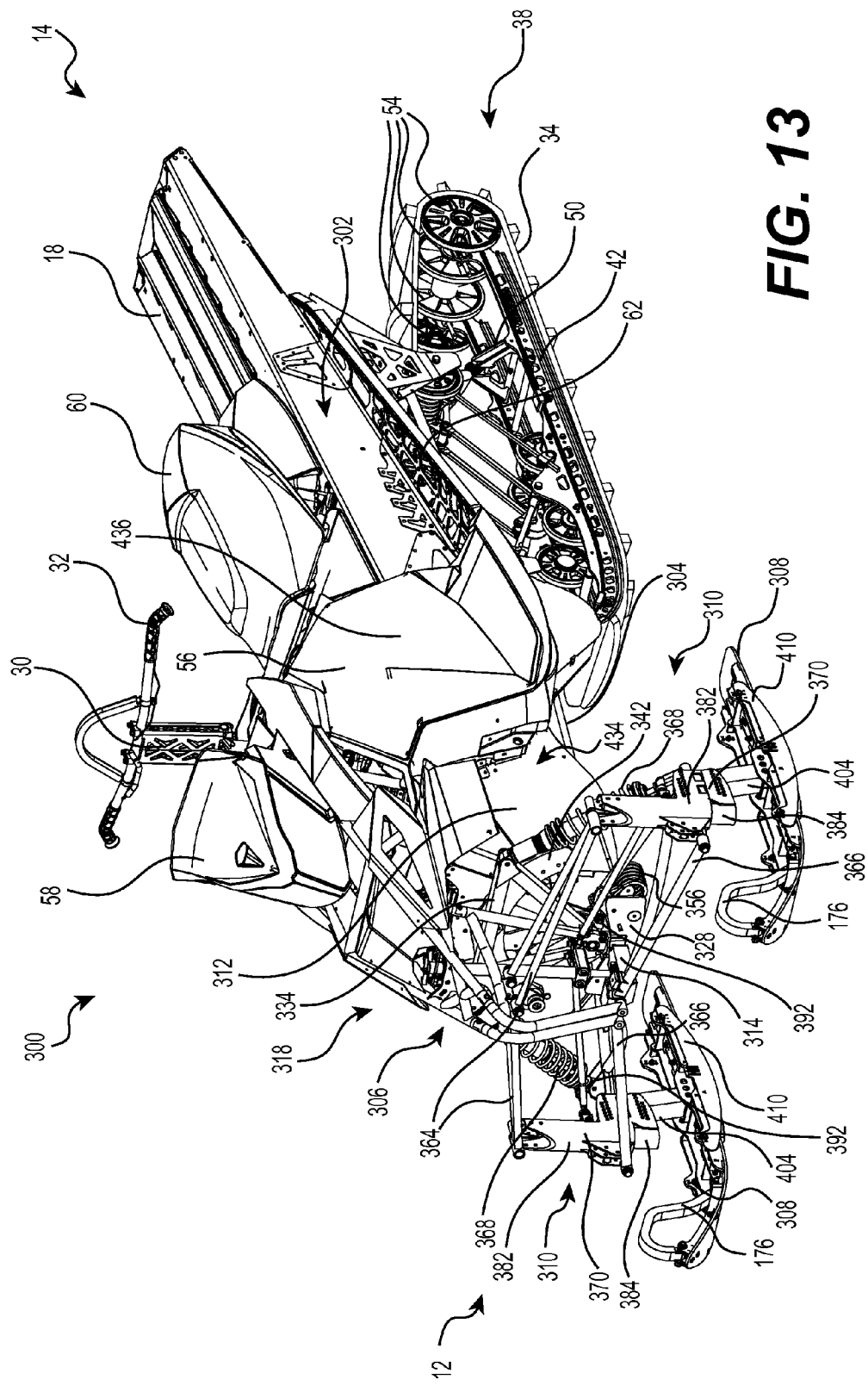
FIG. 13 is a perspective view, taken from a front, left side, of an alternative embodiment of a leaning snowmobile.
Figure 14:
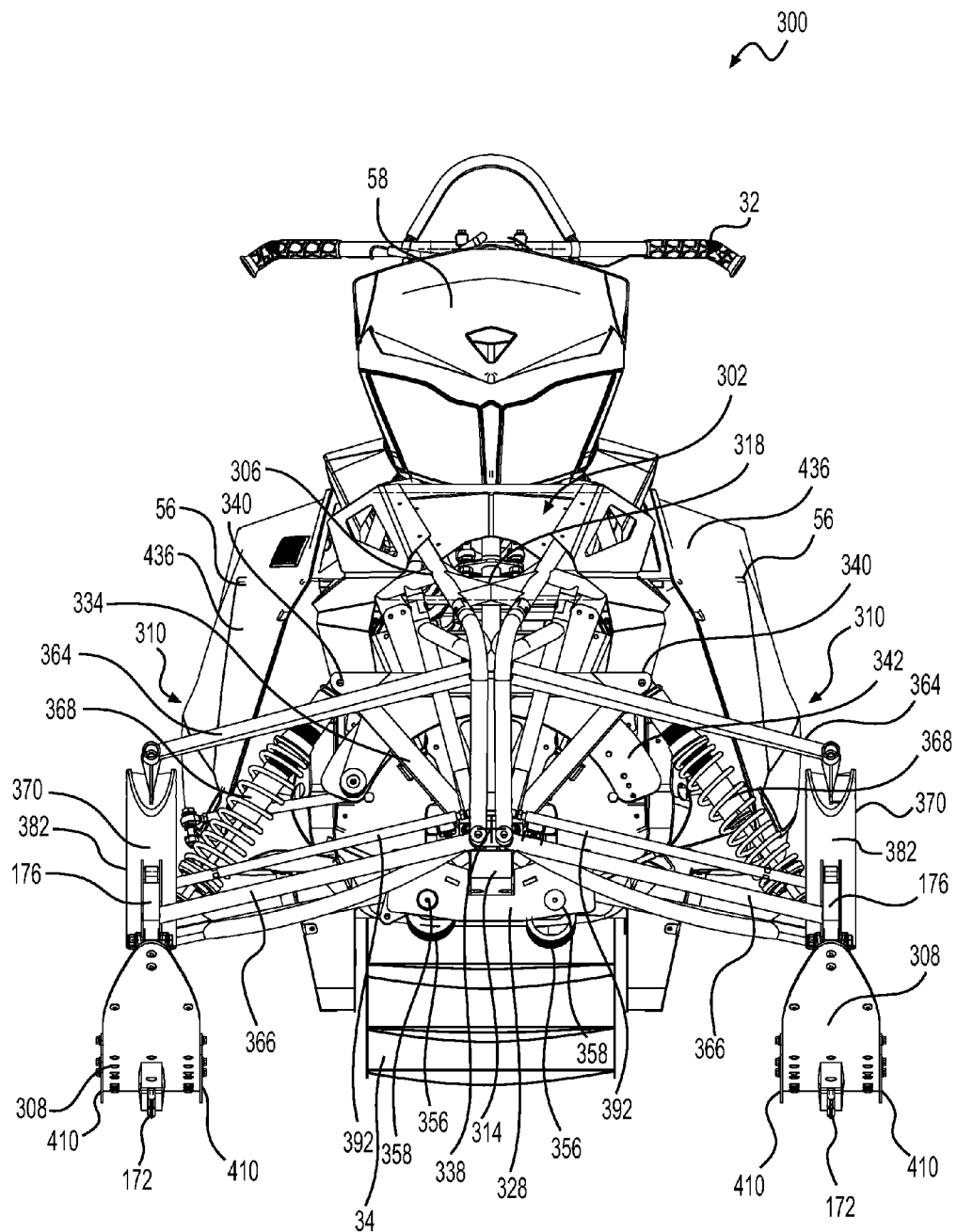
FIG. 14 is a front a front elevation view of the snowmobile of FIG. 13.

Turning now to FIGS. 11 and 12, the drive track 34 will be described in more detail. To facilitate leaning of the frame 16, the track 34 is provided with an arcuate lateral profile as can be seen in FIG. 12. The radius of curvature R1 of the track 34 and the radius of curvature R2 of an arc 210 (FIG. 8) passing through the lateral edges of the ground contacting surfaces of a ski 26 are selected to be approximately equal to or equal to each other. If the radius R1 is greater than the radius R2, the rear of the snowmobile 10 will be pushed up as the frame 16 (and track 34) leans, thereby removing some pressure from the skis 26. However, this can be at least partially counteracted by changing the lateral distance between the lower suspension arm pivot axes 164.

The drive track 34 has central terrain lugs 40A alternating with pairs of outer terrain lugs 40B along the length of the track 34. As can be seen in FIG. 12, the central terrain lugs 40A have a flat central portion with rounded corners of radius R1 and the outer terrain lugs 40B have a rounded edge of radius R1. Between each central terrain lug 40A and pair of outer terrain lugs 40B is connected an arcuate boss 212 of radius R1. Each boss 212 is connected by a pair of fasteners 214 to the belt 216 forming the body of the track 34. As can be seen in FIG. 12, the fasteners 214 protrude from the boss 212 to form cleats, thereby providing additional traction. The bosses 212 are made of plastic, but it is contemplated that they could be made of other materials such as rubber, in which case they could be integrally formed with the belt 216. The pattern of lugs 40A, 40B is only one possible pattern of terrain lugs and other patterns are contemplated. It is also contemplated that the drive track 34 could have generally straight lugs 40A, B. In such an embodiment, it is contemplated that the rear suspension 38 could tilt about a longitudinal axis.

Turning now to FIGS. 13 to 23, an alternative embodiment of a leaning snowmobile, snowmobile 300, will be described. For simplicity, elements of the snowmobile 300 that are similar to those of the snowmobile 10 described above will not be described again in detail and have been labeled with the same reference numerals.

The snowmobile 300 has a frame 302. The frame 302 includes a tunnel 18, an engine cradle portion 304 and a front suspension assembly portion 306. A ski and steering assembly is provided, in which two skis 308 are positioned at the front end 12 of the snowmobile 300, and are attached to the front suspension assembly portion 306 of the frame 302 through front suspension assemblies 310 that will be described in greater detail below.

Figure 16:
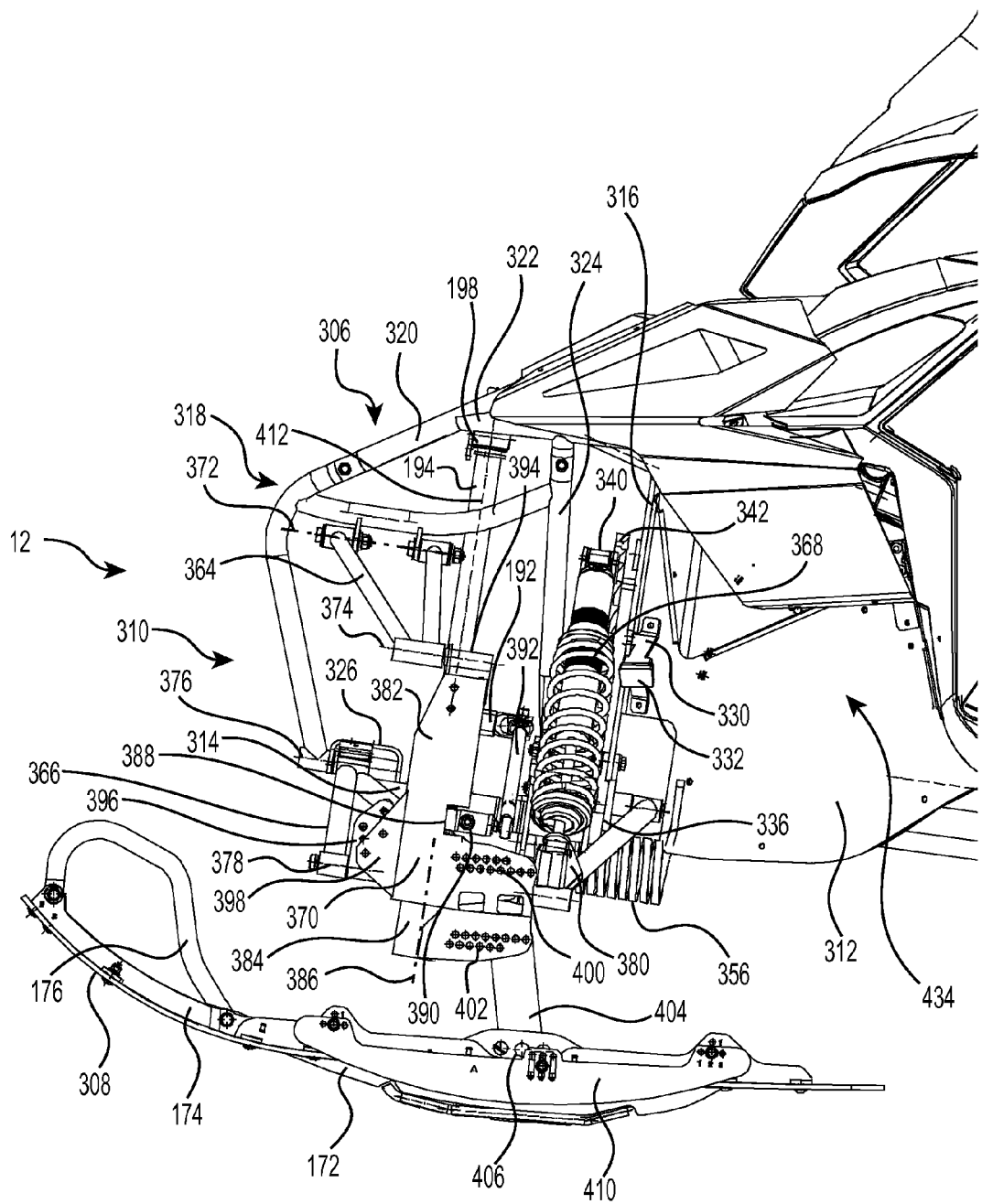
FIG. 16 is a left side elevation view of the front portion of the snowmobile of FIG. 13.
Figure 18:
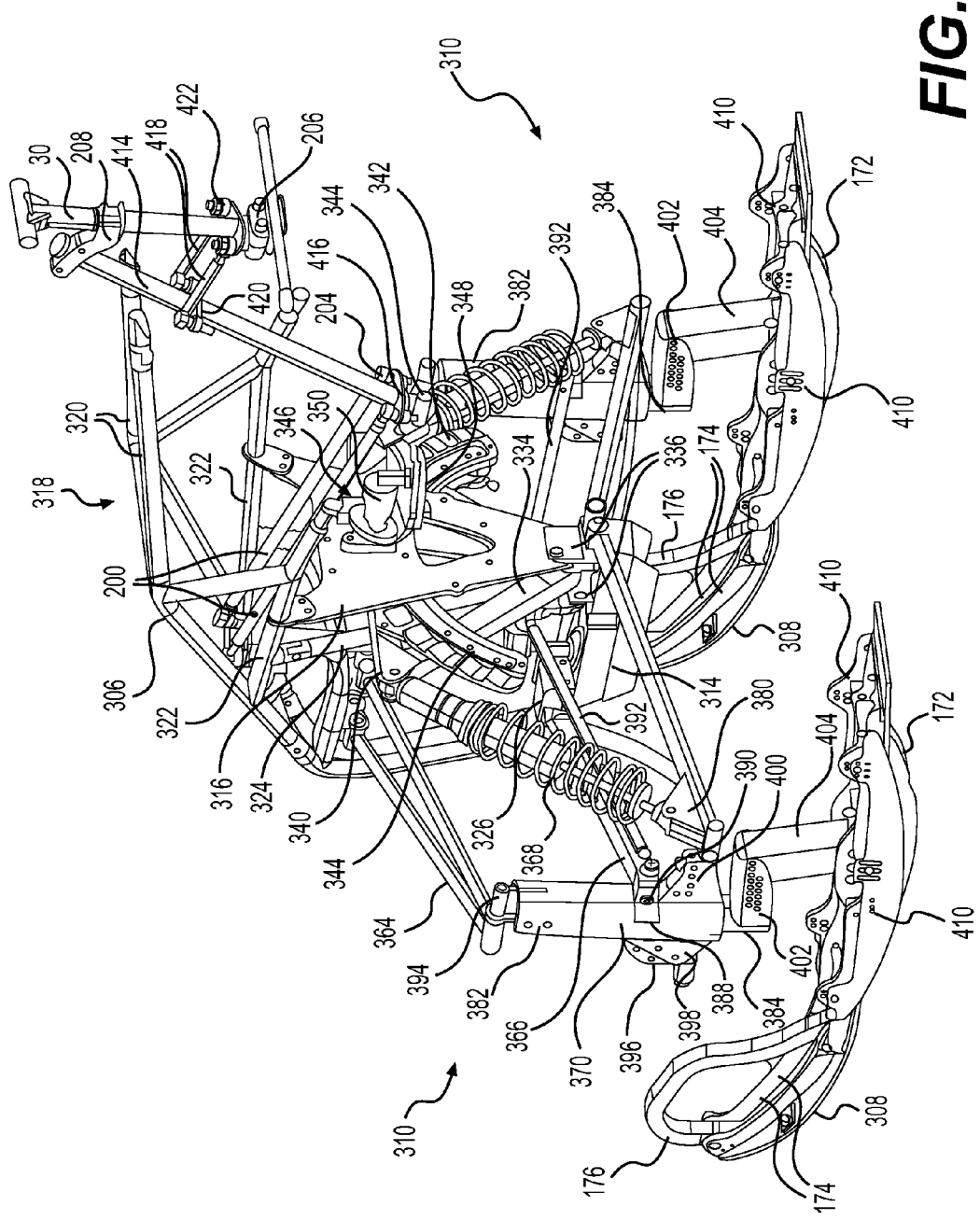
FIG. 18 is a perspective view taken from a rear, left side of front portion of the frame, the front suspension assemblies and the skis of the snowmobile of FIG. 13.

Turning now to FIGS. 16 and 18, the suspension assembly portion 306 will be described in more detail. The suspension assembly portion 306 has a frame member (not shown) fastened to the front of the engine cradle 304. The frame member is laterally centered. It is contemplated that the frame member could be replaced by a plurality of beams, tubes and/or brackets that are fastened, bonded or welded together. Side plates 312 are fastened to the left and right sides of the frame member and to the front of the engine cradle 304. A beam assembly 314 is fastened to front the extruded frame member. A generally triangular sheet metal plate 316 is disposed forward of the side plates 312 and is fastened along its bottom to the beam assembly 314 via a bracket 336. The top of the triangular metal plate 316 is fastened to a tubular frame assembly 318. The tubular frame assembly 318 has two bent tubes 320, two generally horizontal tubes 322, two generally vertical tubes 324 and a number of reinforcement tubes (not numbered for simplicity and clarity of the figures) disposed between the previously mentioned tubes. The two bent tubes 320 are each made of multiple tube sections that are fastened to each other. The lower ends of the bent tubes 320 are fastened to a channel 326 that is fastened to the front of the beam assembly 314. From their lower ends, the bent tubes 320 extend forward and upward next to each other and then extend rearward away from each other. The rear ends of the bent tubes 320 are fastened to the upper end of the engine cradle 304. Each generally horizontal tube 322 is connected at its front end to a corresponding one of the bent tubes 320 near a vertical center thereof and to the engine cradle 304 at its rear end. The top of the triangular metal plate is connected to the generally horizontal tubes 322. The two generally vertical tubes 324 are fastened at their top ends to the generally horizontal tubes 322 forward of the triangular plate 316. From their top ends, the generally vertical tubes 324 extend downward toward each other and are fastened to the top of the beam assembly 314. A spring support plate 328 (FIG. 19) is fastened to the beam assembly 314 forward of the generally vertical tubes 324. Left and right stopper holders 330 (only the left one being shown) are fastened to the side plates 312 near a front thereof. Left and right stoppers 332 are fastened to their respective stopper holders 330. It is contemplated that the stoppers 332 could be integrally formed with the stopper holders 330 or some other portion of the suspension assembly portion 306. It is contemplated that the components of the suspension assembly portion 306 could be made of materials other than metal. For example, it is contemplated that at least some the components of the suspension assembly portion 306 could be made of plastic or composite material. It is also contemplated that at least some of the components of the suspension assembly portion 306 could be connect to each other in an manner other than the one described above such as in any one of the following manners: bonding, welding or by being integrally formed with each other. Other manners of connecting elements to each other are also contemplated. It is also contemplated that the plates 312 could be replaced by one or more beams, tubes and/or brackets that are fastened, bonded or welded together. It is also contemplated that one or more of the tubes of the tubular frame assembly 318 could be replaced by one or more beams, plates and/or brackets that are fastened, bonded or welded together.

A shock tower 334 is disposed between the plate 316 and the generally vertical tubes 324. The lower end of the shock tower 334 is fixedly mounted onto a shaft (not shown). The ends of this shaft are disposed inside bearings (not shown) that are received in apertures inside brackets 336 (FIG. 18) mounted on top of the beam assembly 314. As a result, and as will be described in greater detail below, the shock tower 334 can pivot about a pivot axis 338 relative to the frame 302 of the snowmobile 300. The pivot axis 338 is laterally aligned with the longitudinal centerline of the snowmobile 300 when the frame 302 is in an upright position (i.e. the position of the frame 302 shown in FIGS. 13 to 16, 18 and 19). The shock tower 334 is generally triangular in shape, but other shapes are contemplated. For example, the shock tower 334 could be generally T-shaped with a horizontal bar of the T being at a top of the shock tower 334. The top left and right corners of the shock tower 334 act as left and right stoppers 340. Alternatively, it is contemplated that separate stoppers could be fastened to the top corners of the shock tower 334. When the frame 302 leans by a predetermined angle relative to the shock tower 334, the corresponding stopper 340 (i.e. the left stopper 340 when the frame 302 leans left and the right stopper 340 when the frame 302 leans right) makes contact with a corresponding portion of the tubular frame assembly 318, as will be described in greater detail below. As can be seen in FIG. 16, when the frame 302 is in the upright position as shown, the stoppers 340 are vertically higher than the stoppers 332.

A rack 342 is fastened to the back of the shock tower 334 as shown in FIG. 18. As such, the rack 342 is fixed relative to the shock tower 334. The rack 342 has a central aperture 343 (FIG. 21) located at a lateral center of the rack 342 at a top thereof. The rack 342 also has left and right rearward facing ratchet surfaces 344 on either sides of the central aperture 343. The central aperture 343 and the ratchet surfaces 344 generally define an arc having the pivot axis 338 as a center of curvature.

As best seen in FIG. 18, a locking mechanism 346 is mounted to the back of the plate 316. The locking mechanism 346 includes an electric motor 348, a cylinder 350 and a pin (not shown). The pin is slidably received in the cylinder 350 and passes through an aperture (not shown) in the plate 316 in alignment with the central aperture 343 of the rack 342 when the frame 302 is in the upright position. The electric motor 348 selectively slides the pin forward such that the pin can be received in the central aperture 343 of the rack 342 when the frame 302 is in the upright position. When the pin is received in the central aperture 343 of the rack 342, the frame 302 is locked in the upright position and cannot pivot relative to the shock tower 334. When the frame 302 is pivoted from the upright position relative to the shock tower 334 and the electric motor 348 slides the pin forwardly such that the pin abuts one of the ratchet surfaces 344, the interaction between the pin and the ratchet surface 344 it abuts prevents the frame 302 from pivoting further away from the upright position, but permits the frame 302 to pivot back to the upright position such that the pin can be received in the central aperture 343 of the rack 342, thereby locking the frame 302 in the upright position. When the electric motor 348 slides the pin rearward such that the pin is not received in the central aperture 343 of the rack 342 and does not abut a ratchet surface 344 of the rack 342, the frame 302 is free to lean relative to the shock tower 334 until one of the stoppers 340 makes contact with the tubular frame assembly 318 as will be discussed in greater detail below. It is contemplated that the electric motor 348 could be replaced by another type of actuator, such as, but not limited to, a hydraulic actuator or a solenoid. It is also contemplated that the rack 342 could be connected to the front side of the shock tower 334, with the ratchet surfaces 344 facing forward and the locking mechanism 346 mounted forwardly thereof.

It is contemplated that the electric motor 348, and therefore the position of the pin, can be controlled by a switch, buttons or any other input means to be actuated by the driver of the snowmobile 300. As a result, the driver of the snowmobile 300 can decide to operate the snowmobile 300 as a leaning vehicle by unlocking the frame 302 from the shock tower 334 or to operate the snowmobile 300 as a more typical steer-in-direction snowmobile by locking the frame 302 relative to the shock tower 334. It is also contemplated that the electric motor 348 could be controlled to automatically move the pin forward when the snowmobile 300 is operated below a predetermined speed or stopped.

Figure 24:
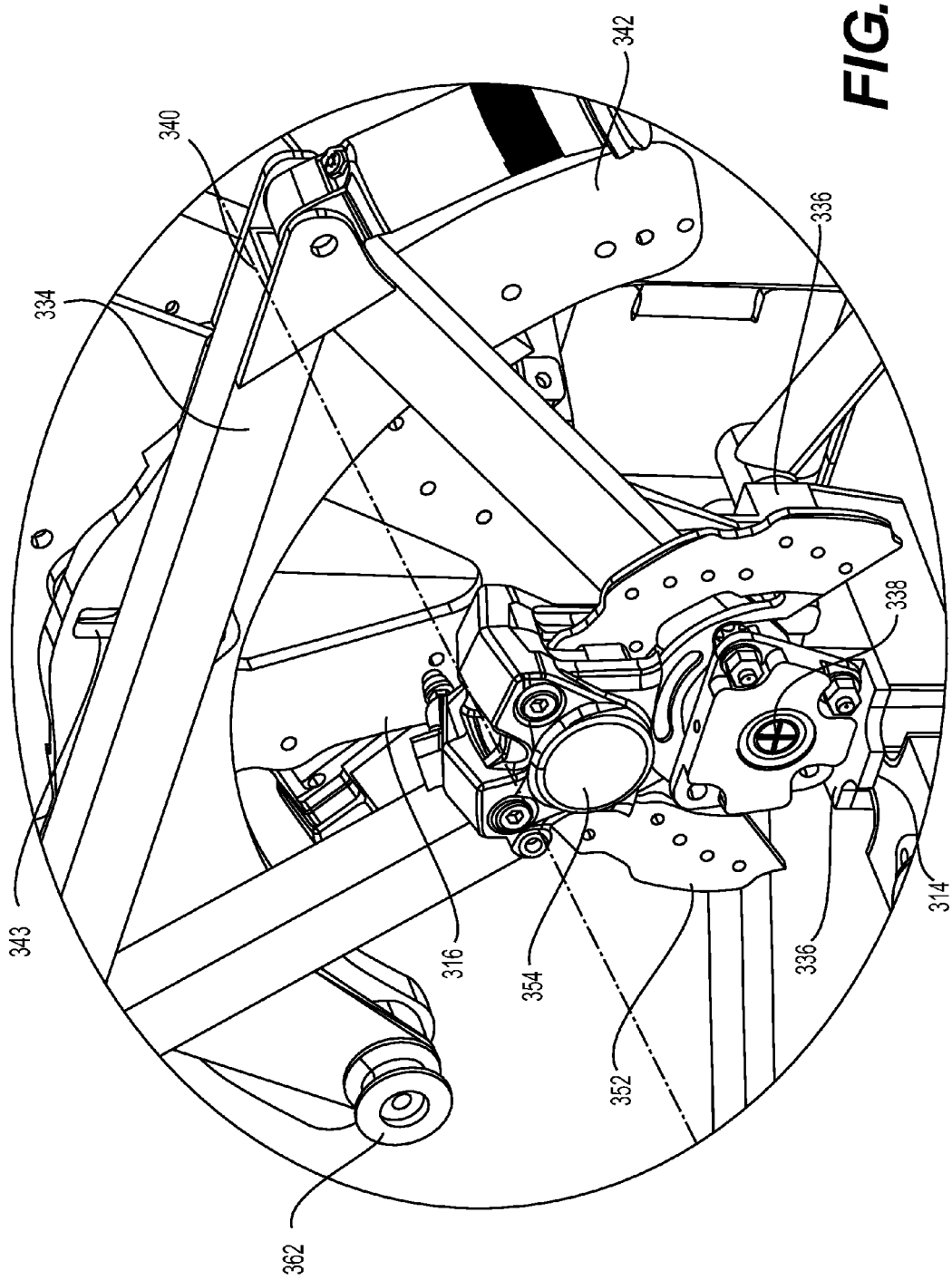
FIG. 24 is a close-up perspective view taken from a front, left side of an alternative embodiment of a shock tower being provided with a brake.

In an alternative embodiment shown in FIG. 24, a section of a brake disc 352 is fixedly mounted to the frame 302 in front the shock tower 334 via the front bracket 336 so as to pivot about the pivot axis 338 with the frame 302. A caliper and brake pad assembly 354 is mounted to the shock tower 334. The caliper and brake pad assembly 354 can be hydraulically actuated, via a brake lever for example, by a driver of the snowmobile 300 to apply a braking force to the section of the brake disc 352 to stop the leaning of the frame 302 about the pivot axis or to reduce the speed at which the frame 302 leans. It is contemplated that the section of the brake disc 352 could be mounted to the shock tower 334 and the caliper and brake pad assembly 354 could be mounted to the frame 302.

Figure 19:
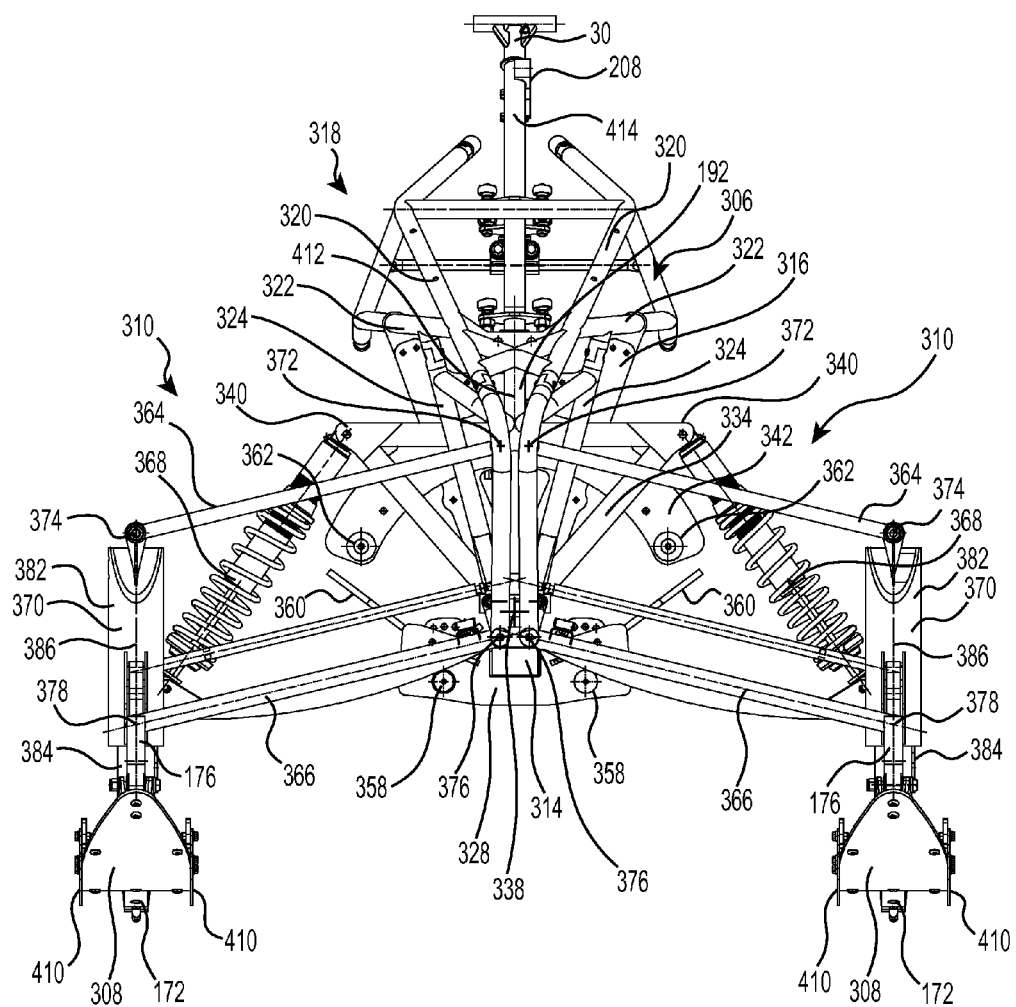
FIG. 19 is a front elevation view of the snowmobile components of FIG. 18 shown in an upright position.

Turning back to the embodiment of FIGS. 13 to 23, the spring support plate 328 supports two torsion springs 356. The springs 356 are dispose around posts 358 extending rearward of the spring support plate 328. As can be seen in FIG. 19, when the frame 302 is in the upright position the posts 358, and therefore the springs 356, are disposed lower than the pivot axis 338 on either side thereof. Each spring 356 has one end portion 360 that extends upwardly and laterally outwardly. The other end of each spring 356 is held in place so as to limit rotation of the spring 356 about its post 358. In the present embodiment, the other end of each spring 356 is held in place by its corresponding plate 312 as can be seen in FIG. 16. The rack 342 has two bumpers 362 mounted to a front surface thereof. One bumper 362 is mounted at each end of the rack 342. As can be seen in FIG. 19, when the frame 302 is in the upright position the bumpers 362 are spaced from the end portions 360 of the springs 356. As will be described in more detail below, when the snowmobile 300 turns and the frame 302 leans toward the inside of the turn by a certain amount, the bumper 362 on the outside of the turn abuts the end portion 360 of its corresponding spring 356. As a result, the spring applies a force on the rack 342 that is transferred to the shock tower 334, the front suspension assembly 310 on the inside of the turn, and the ski 308 on the inside of the turn. This force that is transferred to the ski 308 disposed on the inside of the turn pushes down on the ski 308 disposed on the inside of the turn. The more the frame 302, the greater the force generated by the spring 356 becomes. In one embodiment, the bumper 362 disposed on the outside of the turn starts abutting the end portion 360 of its corresponding spring 356 when the center of gravity CG (FIG. 22) of the snowmobile 300 is disposed laterally outward of the edge of the track 34 disposed inside of the turn. It is contemplated that the springs 356 could be disposed such that the bumpers 362 always abut the end portions 360 of the springs 356. It is contemplated that the springs 356 could be replaced by springs or elastic cords connected between the plate 328 and the ends of the rack 342. It is also contemplated that the springs 356 could be replaced by a single torsion spring disposed around the pivot axis 338 and having both end portions thereof arranged to engage the bumpers 362.

The left front suspension assembly 310 will now be described in more detail. The right front suspension assembly 310 is a mirror image of the left front suspension assembly 310 and will therefore not be described in detail herein. Elements of the right front suspension assembly 310 corresponding to elements of the left front suspension assembly 310 have been labeled with the same reference numerals in the figures.

The left front suspension assembly 310 has upper and lower suspension arms 364, 366, a shock absorber 368 and a ski leg 370.

The upper suspension arm 364 is made of two arms connected at their distal ends to form a generally V-shape. The proximal end of the rear arm of the upper suspension arm 364 is pivotally connected to brackets on the tubular frame assembly 318 about an upper suspension arm pivot axis 372. The upper suspension arm pivot axis 372 is parallel to the pivot axis 338 and, as best seen in FIG. 19, is slightly laterally offset from the pivot axis 338 when the frame 302 is in the upright position. The distal ends of the two arms of the upper suspension arm 364 is pivotally connected to the upper end of the ski leg 370 about a pivot axis 374 as will be described in greater detail below. The pivot axis 374 is parallel to the pivot axis 372.

The lower suspension arm 366 is made of a front arm, a rear arm, and a diagonal arm. The proximal end of the diagonal arm is connected to the proximal end of the front arm and the distal end of the diagonal arm is connected to the distal end of the rear arm. The proximal end of the rear arm of the lower suspension arm 366 is pivotally connected about a lower suspension arm pivot axis 376 to the rear of the rear bracket 336 as best seen in FIG. 16. The proximal ends of the front and diagonal arms of the lower suspension arm 366 are pivotally connected about the lower suspension arm pivot axis 376 to the bracket 326 as best seen in FIG. 16. The lower suspension arm pivot axis 376 is parallel to the pivot axis 338 and, as best seen in FIG. 19, is slightly laterally offset from the pivot axis 338 when the frame 302 is in the upright position. The rear arm of the lower suspension arm 366 provides a contact surface for the stopper 332 to abut under certain conditions as will be described in greater detail below. It is contemplated that the stopper 332 could be attached on the rear arm of the lower suspension arm 366 and that a contact surface could be provided on the frame 302 at the position where the stopper 332 is shown in the FIG. 16. The distal end of the front arm of the lower suspension arm 366 is pivotally connected to a front of the ski leg 370 about a pivot axis 378 as will be described in greater detail below. The distal ends of the rear and diagonal arms of the lower suspension arm 366 are pivotally connected to a rear of the ski leg 370 about the pivot axis 378 as will be described in greater detail below. The pivot axis 378 is parallel to the pivot axis 376

The shock absorber 368 includes a hydraulic damper around which is disposed a coil spring. The lower end of the shock absorber 368 is pivotally connected to a bracket 380 (FIG. 16) connected to the distal ends of the rear and diagonal arms of the lower suspension arm 366. The upper end of the shock absorber 366 is pivotally connected to the corresponding distal end of the shock tower 334. As can be seen in FIG. 18, for the left end of the shock tower 334, a space is formed between the front and rear sides of the shock tower 334 at its distal end to receive the upper end of the shock absorber 334 therein. As can be seen in FIG. 19, the lower end of the shock absorber 334 is located laterally outwardly of its upper end.

The left ski leg 370, the left ski 308 and its connection to the left ski leg 370 will now be described in more detail. The right ski leg 370, the right ski 308 and its connection to the right ski leg 370 are a mirror image of the left ski leg 370, the left ski 308 and its connection to the left ski leg 370 and will therefore not be described in detail herein. Elements of the right ski leg 370, the right ski 308 and its connection to the right ski leg 370 corresponding to elements of the left ski leg 370, the left ski 308 and its connection to the left ski leg 370 have been labeled with the same reference numerals in the figures.

With reference to FIGS. 16 to 19, the left ski leg 370 has an outer leg portion 382 and an inner leg portion 384. The inner leg portion 384 is disposed in part inside the outer leg portion 382 and is pivotable therein. The outer leg portion 382 pivots about a steering axis 386 which also corresponds to the caster line. The outer leg portion 382 has an aperture 388 on a rear side thereof. A steering linkage 390 connects to the inner leg portion 384 through the aperture 388. The steering linkage 390 is connected to the distal end of a steering rod 392 via a ball joint. The proximal end of the steering rod 392 is connected to the pitman arm 192 connected to the lower portion of the steering column 194.

A connector 394 is connected to the upper end of the outer leg portion 382. The distal end of the upper suspension arm 362 is pivotally connected to the connector 394 about the axis 374. The connector 394 has a plurality of apertures (not shown) that allow the connector 394 to be connected in a plurality of positions to raise or lower the position of the distal end of the upper suspension arm 362 relative to the ski 308. A connector 396 is connected to a bracket 398 on the front of the outer leg portion 382. The distal end of the front arm of the lower suspension arm 364 is pivotally connected to the connector 396 about the axis 378. The connector 396 has a plurality of apertures that allow the connector 396 to be connected in a plurality of positions to raise or lower the position of the distal end of the front arm of the lower suspension arm 364 relative to the ski 308. A connector (not shown) is connected to a bracket 400 on the rear of the outer leg portion 382. The distal end of the rear and diagonal arms of the lower suspension arm 364 are pivotally connected to the connector about the axis 378. The bracket 400 has a plurality of apertures that allow the connector to be connected in a plurality of positions to raise or lower the position of the distal ends of the rear arm of the lower suspension arm 364 relative to the ski 308. The apertures in the bracket 400 also allow lower suspension arms having a geometry different from that of the lower suspension arm 364 to be connected to the ski leg 370.

A bracket 402 is connected to the lower end of the inner leg portion 384 at a rear thereof. The bracket 402 pivots about the steering axis 386 with the inner leg portion 384. The bracket 402 has a plurality of apertures. A lower leg 404 is connected to the bracket 402 via the apertures defined in the bracket 402. The apertures in the bracket 402 allow the longitudinal position of the lower leg 404 to be adjusted. The ski 308 is pivotally connected about a pivot axis 406 (FIG. 16) to the lower leg 404 by a fastener. The ski 308 has three sets of apertures to which the lower leg 404 can be connected.

By changing the position of the ski 308 relative to the ski leg 370 along the longitudinal axis of the ski 308 by changing the apertures of the bracket 402 to which the lower leg 404 is connected and/or by changing the aperture of the ski 308 to which the lower leg 404 is connected, the trail length L' (FIG. 17) of the ski 308 is changed. The trail length L' is the distance between the point of intersection of a vertical line 408 passing through the pivot axis 406 with the ground and the point of intersection of the caster line (i.e. steering axis 386) with the ground.

A blade 410 is connected to each side of the ski 308. The blades 410 extend below the floatation surface of the ski 308. As best seen in FIG. 16, each blade 410 has a plurality of holes and slot to allow its longitudinal and vertical position relative to the rest of the ski 308 to be adjusted. It is contemplated that blades having lengths and/or heights different from those of the blades 410 could be used. It is also contemplated that the blades 410 could be integrally formed with the ski 308.

As best seen in FIG. 19, when the frame 302 is in the upright position with the skis 308 being steered in a straight ahead direction, the external surfaces of the blades 410 (i.e. the surfaces of the blades 410 facing away from a longitudinal centerline of their respective ski 308) are parallel to the pivot axis 412 of the steering column 194 to which the pitman arm 192 is connected. Also, in the same arrangement, the pivot axis 412 is parallel to the steering axes 386 of the inner leg portions 384. Also, as can be seen in FIG. 16, the pivot axis 412 is also perpendicular to the pivot axes 372, 374 of the upper suspension arms 364 and the pivot axes 376, 378 of the lower suspension arms 366. This geometry results in no change in caster and camber when the suspension assemblies 310 are compressed. Also, this geometry eliminates bump steering. Bump steering is steering of the skis that can occur in some snowmobiles as a result of the suspension assemblies moving up or down and not as a result of the user turning the handlebar 32.

Figure 17:
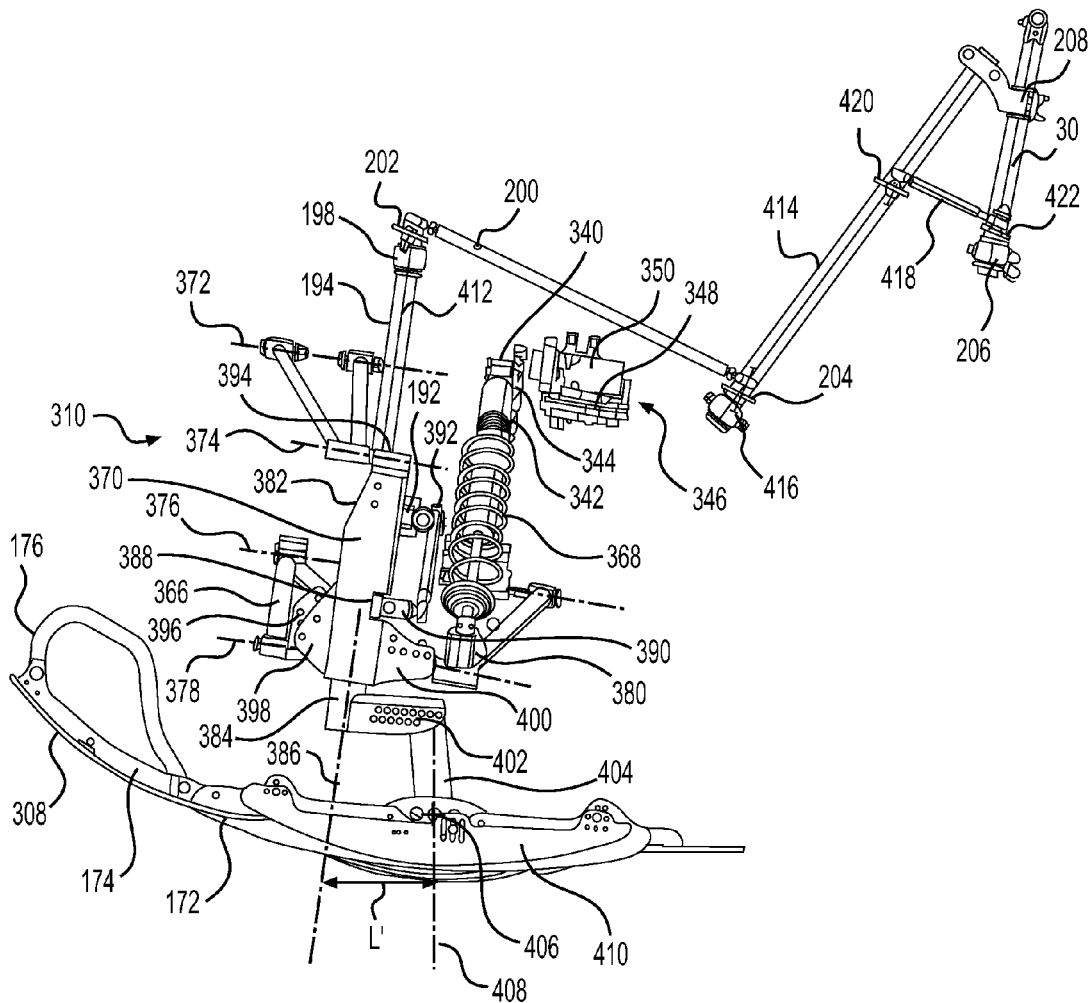
FIG. 17 is a left side elevation view of a left ski, a front left suspension assembly and elements of a steering assembly of the snowmobile of FIG. 13.

To steer the skis 308, each ski leg 370 is connected to a steering rod 392 which is also connected to the pitman arm 192 connected to the lower portion of the steering column 194 as mentioned above. As can be seen in the figures, the pitman arm 192 and the steering column 194 are disposed forwardly of the shock tower 334. As in the snowmobile 10 described above, a pair of connecting rods 200 having ball joints at both ends is connected between a flange 202 at a top of the steering column 194 and a flange 204. However, in the snowmobile 300, the flange 204 is connected near a bottom of a steering column 414 as can be seen in FIGS. 17 and 18. The steering column 414 is connected to the frame 302 by a lower bracket 416 and the upper bracket 208 to which the steering column 30 is connected. A pair of connecting rods 418 having ball joints at both ends is connected between a flange 420 connected to the steering column 414 and a flange 422 connected near a bottom of the steering column 30. As a result, steering motion can be transferred from the steering column 30 to the steering column 194 via the steering column 414. It is contemplated that the steering columns 30, 414 and 194 could be replaced by one, two or more than three steering columns. It is also contemplated that the snowmobile 300 could be provided with a power steering system where an actuator, such as an electric motor or a hydraulic actuator, moves the steering rods to steer the skis 308 in response to movement of the handlebar 32.

Figure 20:
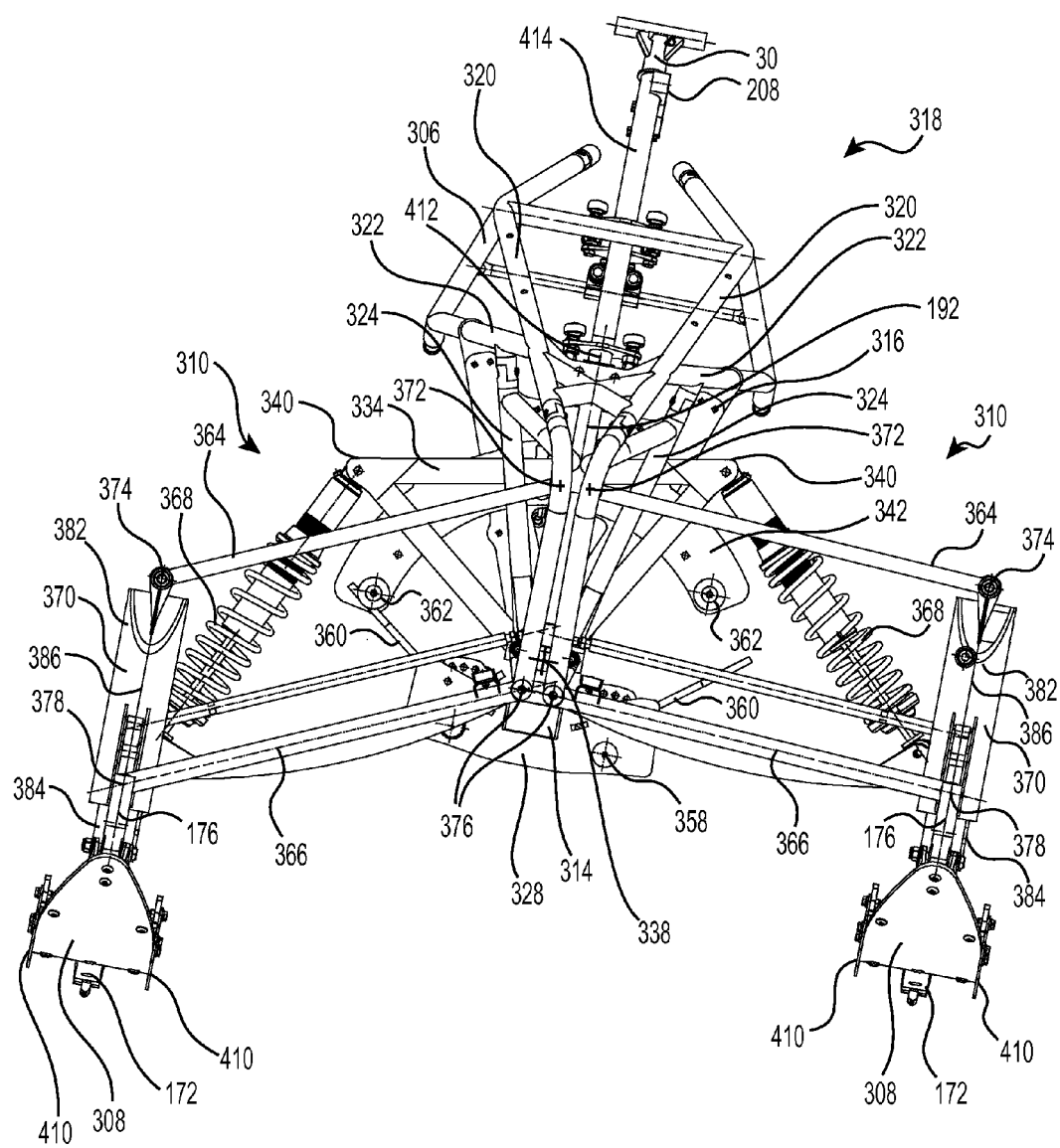
FIG. 20 is a front elevation view of the snowmobile components of FIG. 18 shown leaning toward a left side.
Figure 21:
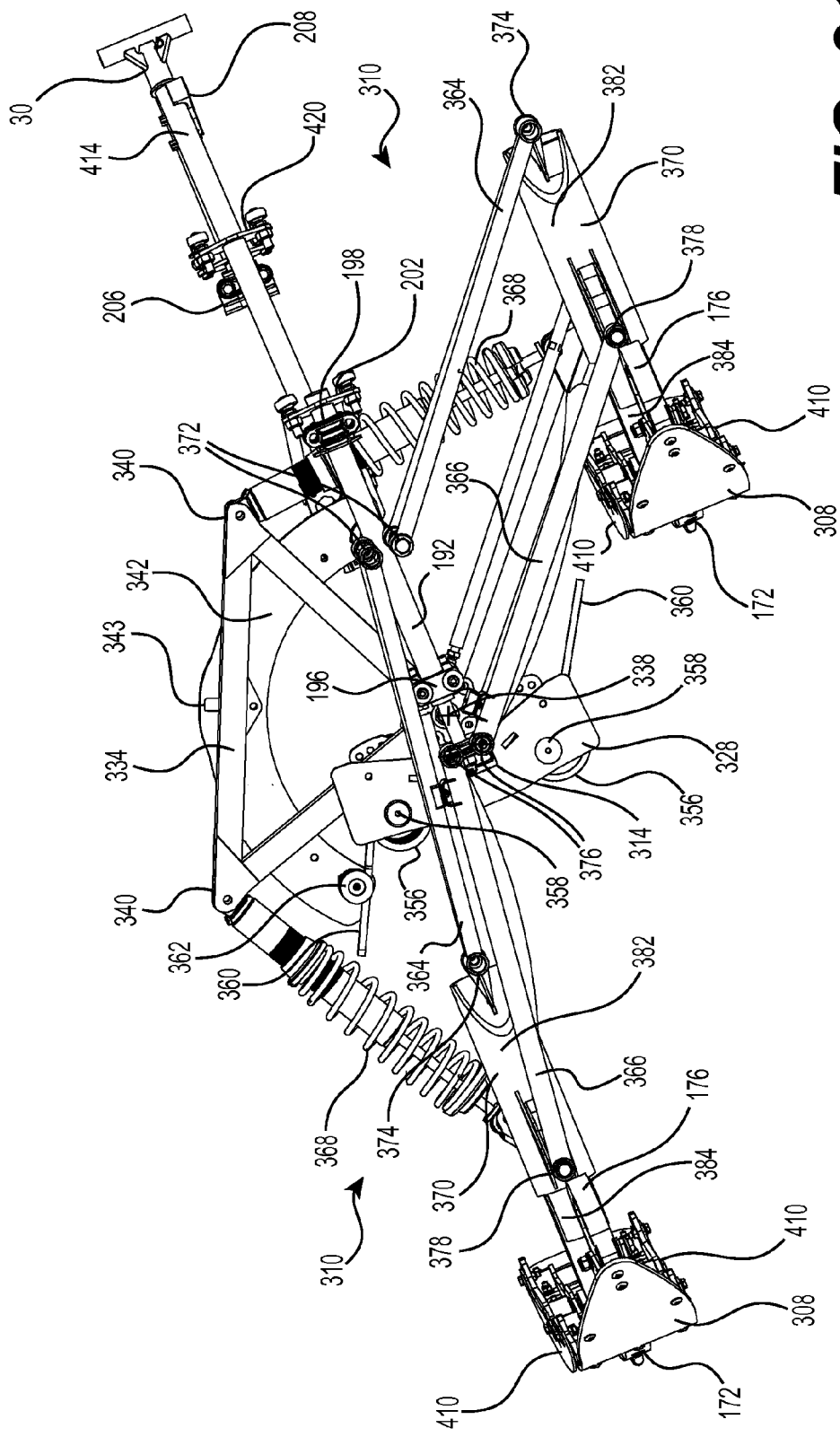
FIG. 21 is a front elevation view of the snowmobile components of FIG. 18 shown leaning further toward the left side, with the frame removed for clarity.
Figure 22:
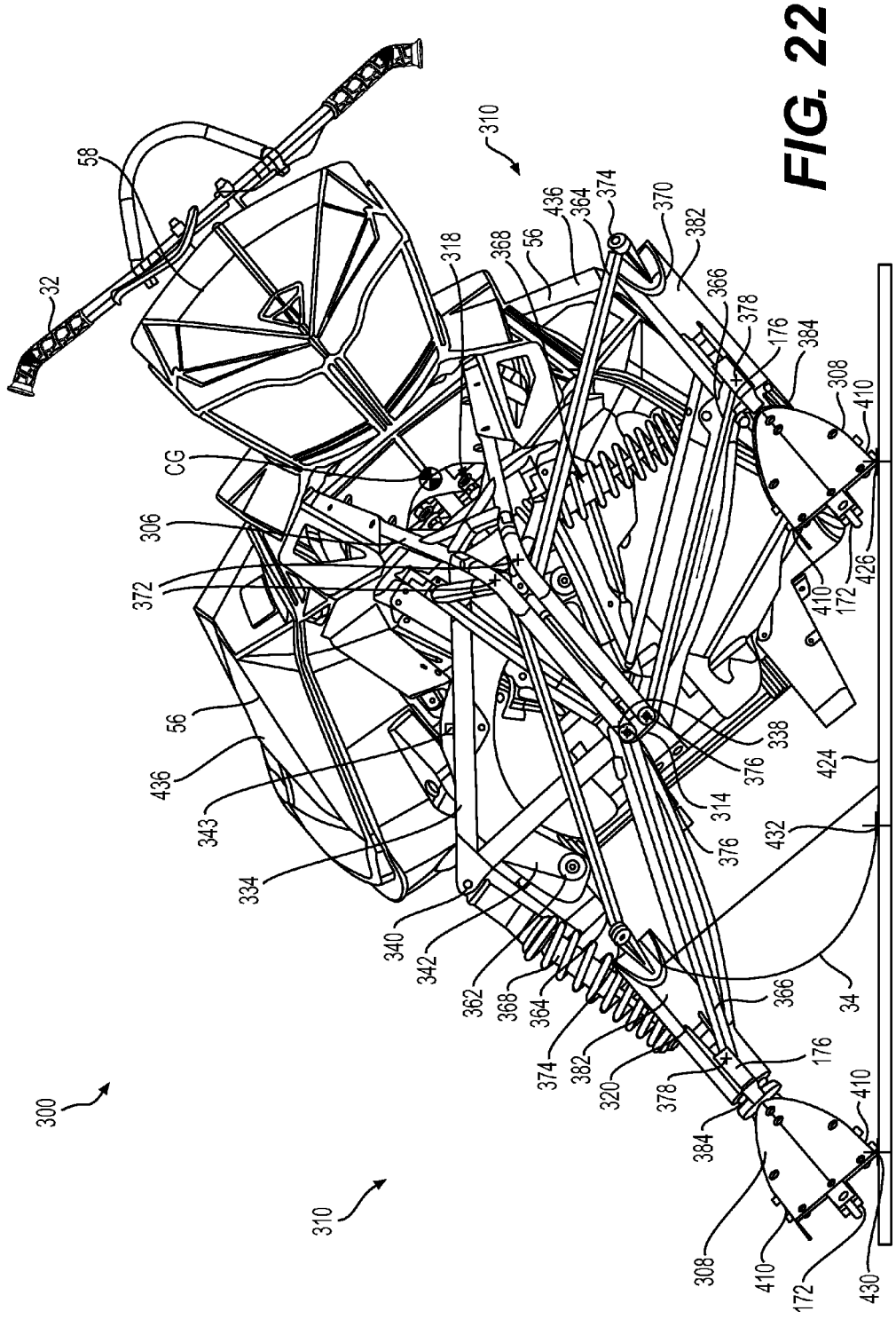
FIG. 22 is a front elevation view of the snowmobile of FIG. 13 shown leaning toward the left side, with some fairings removed.

When the frame 302 is locked to the shock tower 334, the snowmobile 300 is steered by turning the handlebar 32 in the direction in which the driver wants to turn. When the frame 302 is not locked to the shock tower 334, the snowmobile 300 is steered by leaning the frame 302 relative to the shock tower 334 in the direction of the turn. To do this, the driver has to countersteer by momentarily turning the handlebar 32 in the direction opposite to the turn thereby causing a moment that leans the frame 302 into the turn. As explained above, the frame 302 pivots about the pivot axis 338. As can be seen in FIGS. 20 to 22, as the frame 302 pivots about the pivot axis 338, the shock tower 334 remains substantially vertical.

The stoppers 332 and 340 prevent the frame 302 from being pivoted too much about the pivot axis 338. When the frame 302 leans while the snowmobile 300 turns, the spring 356 disposed on the outside of the turn causes a force to be applied on the ski 308 disposed on the inside of the turn to push down on the ski 308 disposed on the inside of the turn. An example of the use of the left stoppers 332 and 340 and the right spring 356 will now be provided for the snowmobile 300 making a left turn as shown in FIGS. 20 to 23. It should be understood that for the snowmobile 300 making a right turn, the same thing occurs but with the right stoppers 332 and 340 and their corresponding contact surfaces on the right side of the snowmobile 300 and the left spring 356.

As the frame 302 pivots toward the left about the pivot axis 338, the end portion 360 of the right spring 356 eventually makes contact with the right bumper 362 mounted to the rack 342 (FIG. 20), and applies a force on the bumper 362. This force is transferred from the bumper 362, to the rack 342 and from the rack 342 to the shock tower 334. As a result, the upper left end of the shock tower 334 applies a force having a downward component on the left shock absorber 368, which in turn applies a force on the left lower suspension arm 366 that is transferred to the left ski leg 370 and ultimately to the left ski 308. Therefore, as a result of the end portion 360 of the right spring 356 making contact with the right bumper 362, a force having a downward component is being applied on the left ski 308, thereby helping to maintain the left ski 308 in contact with the ground. The more the frame 302 pivots toward the left about the pivot axis 338, the greater the force being applied by the right spring 356 becomes and, as a result, the greater the downward component of the force being applied to the left ski 308 becomes.

As the frame 302 is increasingly pivoted about the pivot axis 338 toward the left relative to the shock tower 334 to make a left turn, the frame 302 eventually reaches an angle where the left stopper 340 (i.e. the upper left corner of the shock tower 334) makes contact with the generally right horizontal tube 322 of the tubular frame assembly 318. In an exemplary embodiment, this angle is between 45 and 60 degrees. Between the upright (i.e. no leaning) and the angle where the left stopper 340 makes contact with the right horizontal tube 322, the shock tower 334 remains substantially upright and the shock absorbers 368 are not compressed as a result of the leaning of the frame 302. When the left stopper 340 makes contact with the right horizontal tube 322, the force of the impact is absorbed in part by the left shock absorber 368, thus reducing the vibrations resulting from the impact being transferred to the other components of the snowmobile 300 and to the driver and, if applicable, his passenger. As best seen in FIG. 21, at the angle where the left stopper 340 makes contact with the right horizontal tube 322, the steering columns 192, 414 and 30 are disposed laterally outward of a triangle formed by the connection points of the shock absorber 368 with the shock tower 334 and the pivot axis 358.

Once the left stopper 340 makes contact with the right horizontal tube 322, the frame 302 can continue to be pivoted toward the left, but in order to do this, the left shock absorber 368 has to be compressed. This can be done as a result of the angular momentum resulting from the initial leaning of the frame 302 relative to the shock tower 334 when the left stopper 340 made contact with the right horizontal tube 322 and/or by the driver shifting his weight to cause further pivoting of the frame 302. When the frame 302 is leaned after the left stopper 340 has made contact with the right horizontal tube 322, not only is the frame 302 pivoted but the shock tower 334 and the other components of the snowmobile 300 are also pivoted with it. As the left shock absorber 368 is compressed to provide further leaning of the snowmobile 300, the left stopper 332 moves toward the rear arm of the lower left suspension arm 366 until it makes contact with it, thereby preventing any further leaning of the snowmobile 300 relative to the vertical. In an exemplary embodiment, the amount by which the left shock absorber 368 is compressed when the left stopper 332 contacts the rear arm of the lower left suspension arm 366 corresponds to a 10 to 20 degrees of further leaning of the snowmobile 300 from the angle where the left stopper 340 made contact with the right horizontal tube 322. In an embodiment, when the left stopper 340 contacts the rear arm of the lower left suspension arm 366, the lowest part of the fairings 56 is disposed vertically higher than a line 424 (FIG. 22) passing through the lowest point of each ski 308. This helps prevent the fairings 56 coming into contact with the ground (i.e. snow for example), which could otherwise result in the lowest part of the fairings 56 becoming a supporting structure of the snowmobile 300 thereby removing weight off the skis 308.

The stoppers 332 and 340 on the right side of the snowmobile 300 limit leaning toward the right by the same angles as the stoppers 332 and 340 on left side of the snowmobile 300 limit leaning toward the left.

It is contemplated that the stoppers 332, 340 could be useful in limiting leaning on an assisted leaning system as providing the stoppers 332, 340 would reduce strain on the leaning actuator which is often used to limit the leaning.

Figure 15:
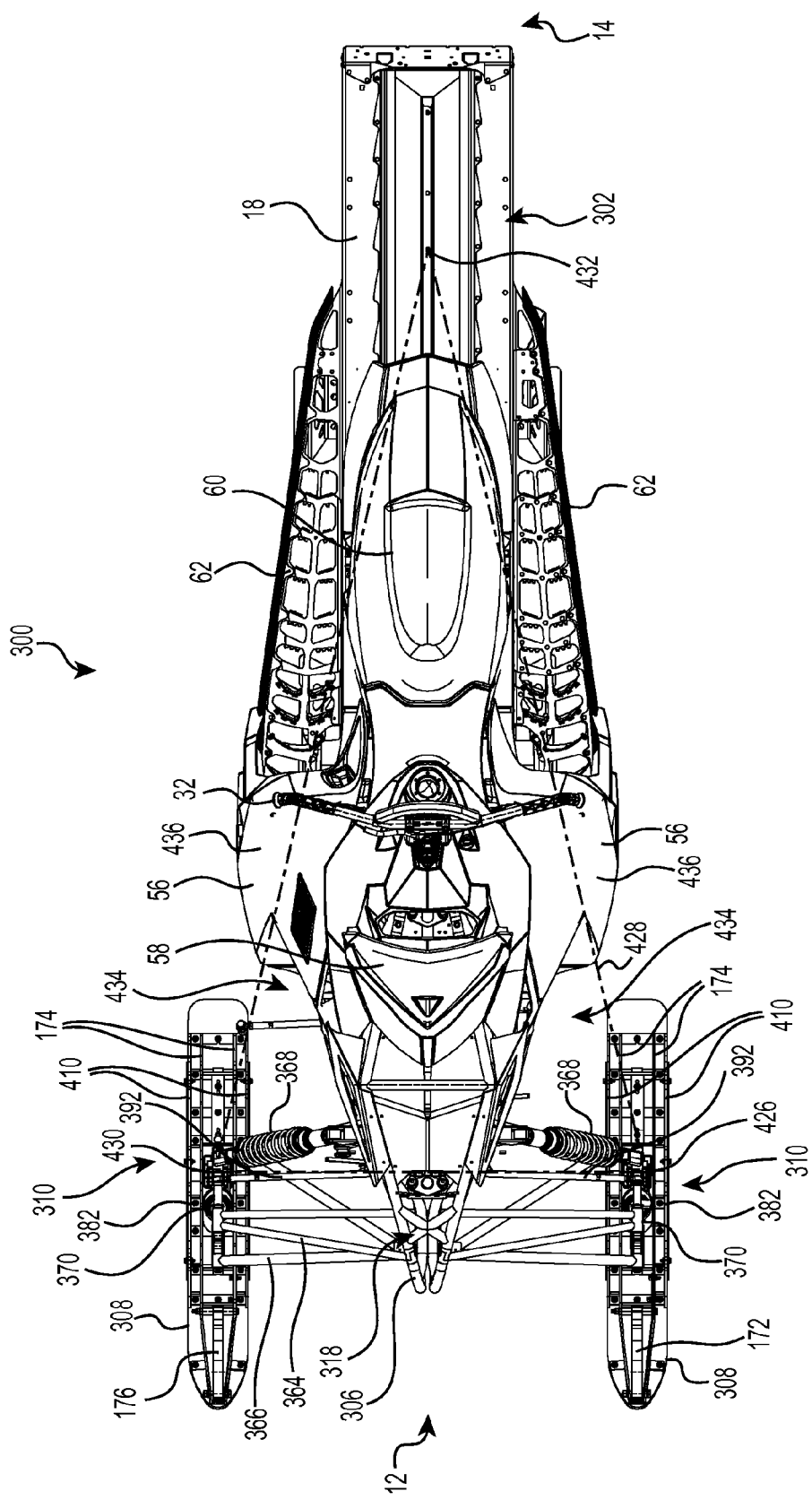
FIG. 15 is a top plan view of the snowmobile of FIG. 13.

When the left stopper 340 makes contact with the right horizontal tube 322, the snowmobile 300 is in its maximum leaning position. In this maximum leaning position toward the left, the center of gravity CG (FIG. 22) of the snowmobile 300 is disposed laterally to the left of the contact point 426 (FIG. 22) of the left ski 308 with the ground that is aligned with the pivot axis 406 of the left ski 308. As such, as viewed from above of the snowmobile 300, the center of gravity CG is also disposed outside of a triangle 428 (FIG. 15) defined by the contact point 426 of the left ski 308 with the ground that is aligned with the pivot axis 406 of the left ski 308, the contact point 430 (FIG. 22) of the right ski 308 with the ground that is aligned with the pivot axis 406 of the right ski 308 and the point of intersection 432 of the load axis of the track 34 with the ground. The load axis of the track 34 is the axis along which a force can be applied that would be statistically equivalent to the distribution of loads across the contact area between the track 34 and the ground. FIG. 15 shows the triangle 428 when the frame 302 is in the upright position. In FIG. 22, the center of gravity CG is disposed laterally to the right of the contact point 426 (i.e. toward the right side of the snowmobile 300), however in FIG. 22 the snowmobile 300 is not in its maximum leaning position. As should be understood, further leaning of the snowmobile 300 toward the left will place the center of gravity CG laterally to the left of the contact point 426 and therefore outside of the triangle 428 as viewed from above the snowmobile 300.

Figure 23:
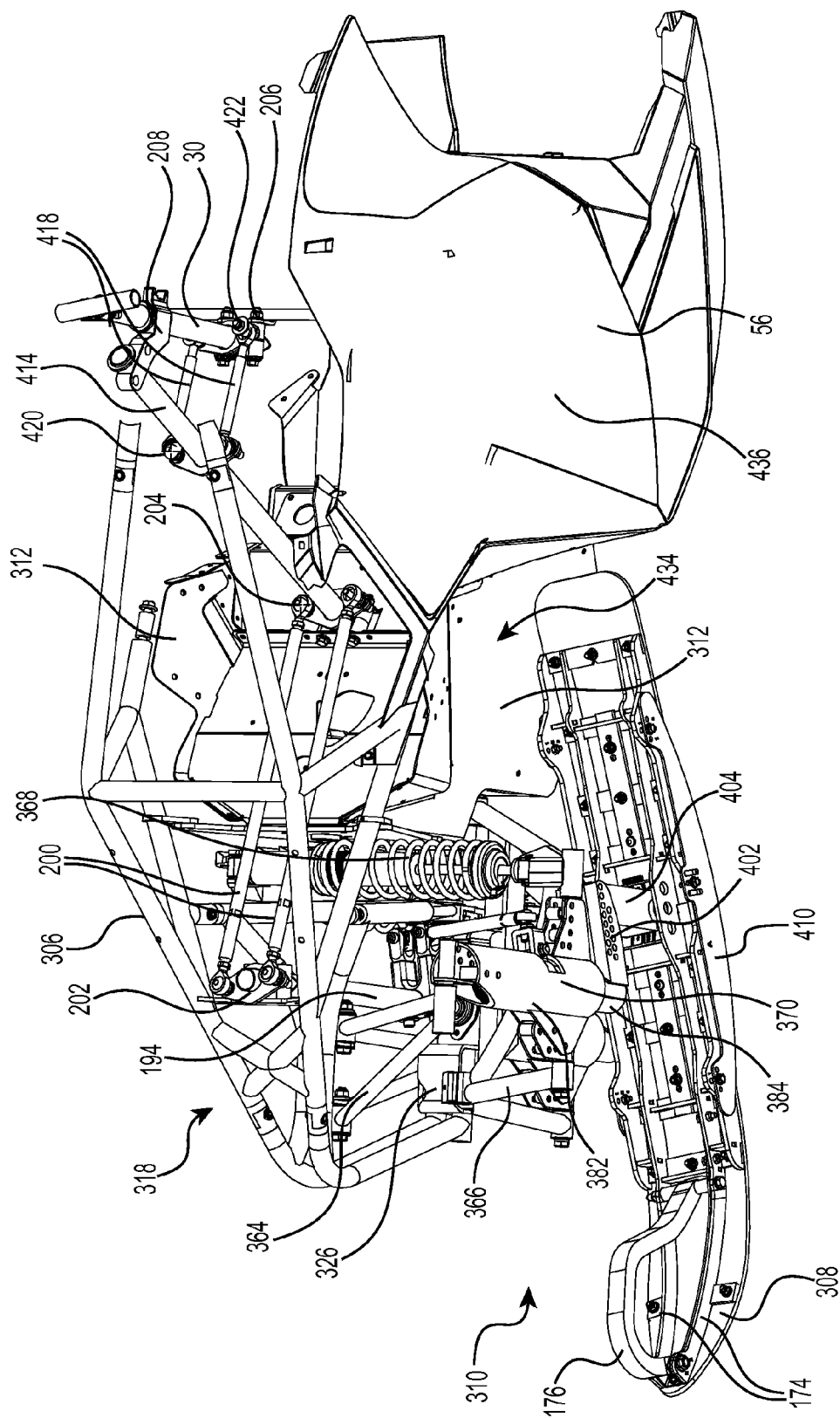
FIG. 23 is a left side elevation view of a front portion of the frame, the steering assembly, a left side fairing, the front suspension assemblies and the left ski of the snowmobile of FIG. 13 shown leaning toward the left side, with the left ski being countersteered toward the left and a front part of the left ski being pivoted downward.

To ensure that the skis 308 do not come into contact with other portions of the snowmobile 300 when the snowmobile 300 leans and/or the skis 308 are turned to steer/countersteer the snowmobile 300 and/or the skis 308 pivot about their pivot axis 406 to follow the configuration of the ground, recesses 434 are formed in the sides of the snowmobile 300. The left recess 434 is disposed to the left of the left side plate 312, forward of the left side panel 436 of the fairings 56 and rearward of the left shock absorber 368. The right recess 434 is disposed to the right of the right side plate 312, forward of the right side panel 436 of the fairings 56 and rearward of the right shock absorber 368. As can be seen in FIG. 23, when the snowmobile 300 is in its maximum leaning position toward the left, with the left ski 308 steered to its maximum position to countersteer the snowmobile 300 in order to return the snowmobile 300 to its upright position and with the left ski 308 pivoted about its pivot axis 406 such the front end of the left ski 308 is in its lowest position and the rear end of the left ski 308 is in its highest position, the rear end of the left ski 308 is received in the left recess 434 and does not come into contact with any part of the snowmobile 300.

Modifications and improvements to the above-described embodiments of the present may become apparent to those skilled in the art. The foregoing description is intended to be exemplary rather than limiting. The scope of the present is therefore intended to be limited solely by the scope of the appended claims.

What is claimed is:

1. A leaning vehicle comprising:
 a frame having a front portion and a rear portion;
 a straddle seat mounted on the frame;
 a motor supported by the frame;
 a shock tower pivotally connected to the front portion of the frame, the frame being pivotable relative to the shock tower about a pivot axis between an upright position and a plurality of leaning positions;
 a first left stopper connected to one of the frame and the shock tower, the first left stopper being adapted to abut another one of the frame and the shock tower when the frame pivots left relative to the shock tower by a first angle thereby limiting pivoting of the frame relative to the shock tower toward the left;

a first right stopper connected to one of the frame and the shock tower, the first right stopper being adapted to abut another one of the frame and the shock tower when the frame pivots right relative to the shock tower by a second angle thereby limiting pivoting of the frame relative to the shock tower toward the right;

a front left suspension assembly and a front right suspension assembly operatively connected to the front portion of the frame;

a front left ground engaging member operatively connected to the front left suspension assembly;

a front right ground engaging member operatively connected to the front right suspension assembly;

a steering assembly operatively connected to the front left ground engaging member and to the front right ground engaging member to steer the vehicle, the steering assembly having a steering column supported by the frame and a handlebar connected to the steering column;

a rear suspension assembly operatively connected to the rear portion of the frame;

a rear ground engaging member operatively connected to the rear suspension assembly;

each of the front left suspension assembly and the front right suspension assembly comprising:
- a leg operatively connected to a corresponding one of the front left ground engaging member and the front right ground engaging member, the leg being rotatable about a steering axis;
- an upper suspension arm having a first end pivotally connected to the frame and a second end pivotally connected to the leg;
- a lower suspension arm having a first end pivotally connected to the frame and a second end pivotally connected to the leg, the lower suspension arm being lower than the upper suspension arm; and
- a shock absorber having an upper end connected to the shock tower and a lower end connected to the lower suspension arm;

a second left stopper connected to one of the frame and the lower suspension arm of the front left suspension assembly, the second left stopper being adapted to abut another one of the frame and the lower suspension arm of the front left suspension assembly when the frame has pivoted left relative to the shock tower by the first angle and the shock absorber of the left suspension assembly is compressed by a first amount thereby limiting leaning of the vehicle relative to vertical toward the left; and a second right stopper connected to one of the frame and the lower suspension arm of the front right suspension assembly, the second right stopper being adapted to abut another one of the frame and the lower suspension arm of the front right suspension assembly when the frame has pivoted right relative to the shock tower by the second angle and the shock absorber of the right suspension assembly is compressed by a second amount thereby limiting leaning of the vehicle relative to vertical toward the right.

2. The vehicle of claim 1, wherein the first left stopper and the first right stopper are connected to the shock tower.

3. The vehicle of claim 2, wherein the second left stopper and the second right stopper are connected to the frame.

4. The vehicle of claim 3, wherein when the frame is in the upright position, the first left stopper and the first right stopper are vertically higher than the second left stopper and the second right stopper.

5. The vehicle of claim 1, wherein the second left stopper and the second right stopper are connected to the frame.

6. The vehicle of claim 5, wherein:
the lower suspension arm of each of the front left suspension assembly and the front right suspension assembly is a lower A-arm having a cross-member;
the second left stopper is adapted to abut the cross-member of the lower A-arm of the front left suspension assembly when the frame has pivoted left relative to the shock tower by the first angle and the shock absorber of the left suspension assembly is compressed by the first amount; and
the second right stopper is adapted to abut the cross-member of the lower A-arm of the front right suspension assembly when the frame has pivoted right relative to the shock tower by the second angle and the shock absorber of the right suspension assembly is compressed by the second amount.

7. The vehicle of claim 1, wherein when the frame is in the upright position, the first left stopper and the first right stopper are vertically higher than the second left stopper and the second right stopper.

8. The vehicle of claim 1, wherein the first angle equals the second angle; and
wherein the first amount equals the second amount.

9. The vehicle of claim 1, further comprising:
a rack connected to the shock tower, the rack defining a central aperture; and
a pin operatively connected to the frame and being selectively movable inside the central aperture, the pin locking the frame in the upright position when the pin is received inside the central aperture.

10. The vehicle of claim 9, further comprising an electric motor connected to the pin and adapted to selectively move the pin.

11. The vehicle of claim 9, wherein:
the rack has a left ratchet surface and a right ratchet surface;
the pin is further selectively movable to abut the left and right ratchet surfaces when the frame is pivoted left and right respectively relative to the shock tower;
when the pin abuts the left ratchet surface, the left ratchet surface prevents the frame from pivoting further toward the left and permits the frame from pivoting toward the right up to the upright position where the pin is received in the central aperture;
when the pin abuts the right ratchet surface, the right ratchet surface prevents the frame from pivoting further toward the right and permits the frame from pivoting toward the left up to the upright position where the pin is received in the central aperture.

12. The vehicle of claim 1, wherein the vehicle is a snowmobile; and
wherein:
the rear portion of the frame includes a tunnel;
the front left ground engaging member is a left ski;
the front right ground engaging member is a right ski;
the rear ground engaging member is an endless track disposed at least in part under the tunnel;
the leg of the front left suspension assembly is a left ski leg; and
the leg of the front right suspension assembly is a right ski leg.

13. The vehicle of claim 12, wherein:
the left ski is selectively movable relative to the left ski leg along a longitudinal axis of the left ski; and
the right ski is selectively movable relative to the right ski leg along a longitudinal axis of the right ski.

14. The vehicle of claim 13, wherein the second end of the lower suspension arm of each of the front left suspension assembly and the front right suspension assembly is selectively movable relative to the first end of the lower suspension arm in a longitudinal direction of the vehicle.

15. The vehicle of claim 12, wherein the second end of the lower suspension arm of each of the front left suspension assembly and the front right suspension assembly is selectively movable relative to the first end of the lower suspension arm in a longitudinal direction of the vehicle.

16. The vehicle of claim 12, wherein the motor is an internal combustion engine;
the vehicle further comprises an exhaust pipe fluidly connected to the engine; and
wherein at least a portion of the exhaust pipe extends forwardly of the shock tower.

17. The vehicle of claim 12, wherein the endless drive track has a generally arcuate lateral profile.

18. The vehicle of claim 17, wherein a radius of curvature of an arc passing through lateral edges of ground contacting surfaces of one of the left and right skis is approximately equal or equal to a radius of curvature of the arcuate lateral profile of the endless drive track.

19. The vehicle of claim 12, wherein when the second left stopper abuts the other one of the frame and the lower suspension arm of the front left suspension assembly and the handlebar is turned to steer the skis toward the left, a rear end of the left ski is received in a left recess defined in a left side of the snowmobile; and
wherein when the second right stopper abuts the other one of the frame and the lower suspension arm of the front right suspension assembly and the handlebar is turned to steer the skis toward the right, a rear end of the right ski is received in a right recess defined in a right side of the snowmobile.

20. The vehicle of claim 19, further comprising:
a left side panel connected to the frame rearward of the shock absorber of the front left suspension assembly; and
a right side panel connected to the frame rearward of the shock absorber of the front right suspension assembly;
wherein:
the left recess is disposed rearward of the shock absorber of the front left suspension assembly and forward of the left side panel; and
the right recess is disposed rearward of the shock absorber of the front right suspension assembly and forward of the right side panel.

21. The vehicle of claim 12, further comprising at least one blade connected to at least one side of each of the left and right skis;
wherein the blades extend below the floatation surfaces of the left and right skis.

22. The vehicle of claim 21, wherein when the frame is in the upright position and the skis are steered in a straight ahead direction, the blades are parallel to a pivot axis of the steering column.

23. The vehicle of claim 12, wherein when the second left stopper abuts the other one of the frame and the lower suspension arm of the front left suspension assembly, a center of gravity of the snowmobile is disposed to a left of a contact point between the left ski and a ground; and
wherein when the second right stopper abuts the other one of the frame and the lower suspension arm of the front right suspension assembly, the center of gravity of the snowmobile is disposed to a right of a contact point between the right ski and the ground.

24. The vehicle of claim 1, further comprising fairings connected to the frame;
wherein:
when the second left stopper abuts the other one of the frame and the lower suspension arm of the front left suspension assembly, a lowest part of the fairings when the frame has pivoted left is disposed vertically higher than a line passing through a lowest point of the front left ground engaging member and a lowest point of the front right ground engaging member when the frame has pivoted left; and
when the second right stopper abuts the other one of the frame and the lower suspension arm of the front right suspension assembly, a lowest part of the fairings when the frame has pivoted right is disposed vertically higher than a line passing through a lowest point of the front left ground engaging member and a lowest point of the front right ground engaging member when the frame has pivoted right.

25. The vehicle of claim 1, wherein when one of the first left stopper and the first right stopper abuts the other one of the frame and the shock tower, the steering column is disposed laterally outward of a triangle formed by connection points of the shock absorbers with the shock tower and the pivot axis.

26. The vehicle of claim 1, further comprising:
a pitman arm connected to the steering column, the pitman arm being pivotable with the steering column about a pivot axis of the steering column; and
steering rods connecting the pitman arm to the legs;
wherein the steering axes of the legs are parallel to the pivot axis of the steering column when the frame is in the upright position.

27. The vehicle of claim 26, wherein for each of the front left suspension assembly and the front right suspension assembly the first end of the upper suspension arm is pivotally connected to the frame about an upper suspension arm pivot axis and the first end of the lower suspension arm is pivotally connected to the frame about a lower suspension arm pivot axis; and
wherein the upper suspension arm pivot axes and the lower suspension arm pivot axes are perpendicular to the pivot axis of the steering column.

* * * * *